(12) United States Patent
Zhang

(10) Patent No.: US 8,791,835 B2
(45) Date of Patent: Jul. 29, 2014

(54) METHODS FOR ROAD SAFETY ENHANCEMENT USING MOBILE COMMUNICATION DEVICE

(76) Inventor: Wei Zhang, Newtown, PA (US)

( * ) Notice: Subject to any disclaimer, the term of this patent is extended or adjusted under 35 U.S.C. 154(b) by 279 days.

(21) Appl. No.: 13/269,515

(22) Filed: Oct. 7, 2011

(65) Prior Publication Data

US 2013/0082874 A1 Apr. 4, 2013

Related U.S. Application Data

(60) Provisional application No. 61/542,794, filed on Oct. 3, 2011.

(51) Int. Cl.
*G08G 7/00* (2006.01)

(52) U.S. Cl.
USPC ....... 340/901; 340/435; 340/426.31; 340/465

(58) Field of Classification Search
None
See application file for complete search history.

(56) References Cited

U.S. PATENT DOCUMENTS

| | | | |
|---|---|---|---|
| 2002/0124629 A1* | 9/2002 | Hurson | 73/9 |
| 2002/0198632 A1* | 12/2002 | Breed et al. | 701/1 |
| 2006/0089790 A1* | 4/2006 | Dupuis | 701/207 |
| 2006/0097857 A1* | 5/2006 | Osaka et al. | 340/435 |
| 2006/0177103 A1* | 8/2006 | Hildreth | 382/107 |
| 2007/0001869 A1* | 1/2007 | Hunzinger | 340/903 |
| 2009/0051510 A1* | 2/2009 | Follmer et al. | 340/425.5 |
| 2010/0002075 A1* | 1/2010 | Jung et al. | 348/78 |
| 2010/0214130 A1* | 8/2010 | Weinmann et al. | 340/945 |

FOREIGN PATENT DOCUMENTS

JP    10122871 A  *  5/1998

* cited by examiner

*Primary Examiner* — Brian Zimmerman
*Assistant Examiner* — Kevin Lau

(57) ABSTRACT

Methods for road safety enhancement use mobile communication device (MCD) onboard vehicle to share traveling data through inter-vehicle communication broadcasting, perform road hazard warning, enhance road navigation, and provide autonomous road assistance. The methods have a variety of vehicle status data, such as moving data, steering data, or indicator data, obtained through GPS or image capturing and recognition of instrument cluster of vehicle. The image capturing and recognition allows to get speed data from indication of speedometer, indication of left or right turn signal, steering action data corresponding to steering wheel rotation, and light-on indication of system status indicators. To facilitate that, the MCD may be placed in front of steering wheel, and, if applicable, also in coupling with movement of steering wheel. The MCD may perform relative positioning map-matching lane correlation and GPS-update-interval speed positioning to improve data quality regarding vehicle moving status.

21 Claims, 17 Drawing Sheets

METHODS FOR ROAD SAFETY ENHANCEMENT USING MOBILE COMMUNICATION DEVICE

CROSS-REFERENCE TO RELATED APPLICATIONS

The present application claims the benefit of U.S. Provisional Application Ser. No. 61/542,794 filed by Wei Zhang on Oct. 3, 2011, which is incorporated herein by reference.

STATEMENT REGARDING FEDERALLY SPONSORED RESEARCH OR DEVELOPMENT

Not applicable.

FIELD OF THE INVENTION

The present invention relates to road safety of ground vehicle involving GPS based road navigation, vehicle collision avoidance through inter-vehicle communication, and road emergency assistance.

BACKGROUND OF THE INVENTION

To improve driving safety, remote sensors are installed on some vehicles to detect presence of nearby road objectives, primarily other vehicles. Once a road objective is detected and identified by control system of the sensors as potential threat to driving safety, the control system coupled with vehicle driving system may control the vehicle to act properly such as braking to avoid a possible collision. The control system may also alert driver with audio sound or flashing of an indicator to draw driver's attention. Such safety system upon remote sensors becomes very sophisticated in order to work reliably for a variety of road situations under all weather conditions. For example, radar type remote sensor is very good at detecting moving vehicle by measuring Doppler frequency shift. Ground scattering noise of radar signal can be easily filtered out. But, rain or snow could severely affect its performance.

As CMOS imaging chip is going cheaper, onboard digital camera may be used for remote sensing to improve driving safety. Because driver must focus his/her attention on the road in front while driving, it is not helpful by just providing captured images of onboard camera to driver. Reliable image recognition must be implemented to detect potential road hazard. Considering varying lighting conditions during day and very low light condition at night, it is very challenging for such image recognition to attain reliable and consistent performance. Active illumination and sophisticated image processing mechanism may be added onto the system to improve performance, thus rendering system cost going much higher. Taking the advantage that CMOS imaging chip can detect a portion of wavelength of near infrared light, CMOS imaging chip based night vision system can provide better view of road condition for night driving. But, unless HUD (Head Up Display) is used to display the image captured by the night vision system, frequently switching eyesight between the road the displayed image may cause driver eye fatigue and delay of response, thus creating another driving hazard. It is probably apparent that, now and in foreseeable future, HUD display is not affordable for most ground vehicles except few luxury cars.

It is to be emphasized that above driving safety systems or similar types are developed to fit on new model of vehicles. Installation of the system on existing vehicle or model without original design consideration for that will involve too much modification and technical confliction, thus either economically infeasible or technically impractical.

An alternative approach to above active sensing system is to use inter-vehicle communication to share moving data of vehicle such as location, speed, and direction and let each vehicle determine on its own potential collision under development after receiving moving data of nearby other vehicles. With advent of GPS (Global Positioning System), ground vehicle having a GPS receiver unit carried therewith could measure its location to a certain accuracy without having to rely on expensive inertial navigation system. Low cost of general GPS unit makes the approach very attractive and affordable. Vehicle with GPS location data constantly updated could send its latest location data to other vehicles through inter-vehicle communication. Other vehicle receives the location data and keeps tracking the location data received for the same vehicle. It can tell the location, speed and direction of nearby vehicle. With assistance of Geographic Information System (GIS), also referred as digital road map herein, it is to be determined whether a collision is under development. If a potential collision is confirmed, driver is alerted to avoid an actual collision from occurring. However, this approach is seriously thwarted by insufficient accuracy of GPS receiver, even more seriously by slow update rate of GPS measurement. Typical GPS receiver has best accuracy about 5-6 meters. Considering typical lane width ranging from about 2.7 meters to about 3.7 meters, it is insufficient to determine which lane of a multi-lane road vehicle is moving on. Lack of lane recognition due to insufficient accuracy of GPS receiver could not discriminate whether a vehicle at faster speed is going to pass by or cause a collision. Thus, warning for collision avoidance yields very high false alarm rate. Typical GPS receiver has update rate of GPS measurement once per several seconds. Considering fast dynamic changing of positions for vehicles on road, many accidents may start and end within seconds. The update rate of once per seconds is too slow to permit a potential collision to be detected on time. Thus, collision won't be avoided due to either warning issued afterward or insufficient time left for driver to respond. It is possible to use very sophisticated differential GPS (DGPS) technology to improve the positioning accuracy. But, such type of GPS receiver system is very expensive and is not realistically seen on most ground vehicles. Furthermore, update rate is sacrificed when a higher positioning accuracy is pursued. When higher update rate is pursued, each measurement suffering from signal-noise variation has less time to collect more signal data, thus having less positioning accuracy. The dilemma of positioning accuracy and update rate is a serious challenge for using GPS for road collision avoidance.

Therefore, it is believed that there is a demand for low cost road safety enhancement system that can be easily deployed on any existing ground vehicle, no matter whether such deployment is preconceived in original design of vehicle, and operationally friendly for driver to get acquainted with. Although GPS based collision avoidance through inter-vehicle communication seems a practical solution for the demand, its performance suffers detrimental effect caused by insufficient positioning accuracy and slow update rate of GPS receiver. Furthermore, only few vehicles equipped with sophisticated GPS receiver with good positioning accuracy and acceptable update rate would not make road safer even for those vehicles because other vehicles are not capable of reporting their locations accurately and timely. This reality issue points out that low cost of solution is vital for such effort to ripen desired advantages.

The information disclosed in this Background of the Invention section is only for the enhancement of understanding of the background of the invention, and should not be taken as an acknowledgment or any form of suggestion that this information forms a prior art that would already be known to a person skilled in the art.

BRIEF SUMMARY OF THE INVENTION

The invention aims to enhance road safety using mobile communication device, for example mobile phone or smart phone, which are either already available or readily available for almost every driver. The mobile communication device may be cell phone or mobile phone or smart phone, PDA (Personal Digital Assistant), tablet computer such as Apple i-Pad or the like, some GPS navigation devices, or portable computer. The mobile communication device often has GPS receiver embodied in its system or is coupled with a GPS receiver through either plug-in communication interface or wireless data link. For mobile phone, it is more and more common to have a built-in GPS receiver. Furthermore, onboard digital camera has already become a standard feature for mobile phone and is close to be a standard feature for other type of mobile communication device. When needed, the mobile communication device useful for the invention should have accesses to digital camera, GPS receiver, and radio communication either through corresponding built-in or plug-in components or data link connections to corresponding devices. However, built-in or plug-in components are preferred since their operational responses could be faster and more reliable. In the disclosure, mobile phone with onboard camera and built-in or plug-in GPS receiver is used as typical example to illustrate the invention. It should be obvious for ordinary skilled in the art to use other type of mobile communication device to take advantages of the invention upon enlightenment or teaching of merits of illustrated examples in the disclosure.

The invention may take advantages of two principles disclosed in the disclosure: relative positioning map-matching lane correlation and GPS-update-interval speed positioning. Relative positioning map-matching lane correlation provides a method to perform lane recognition by matching relative positions of base vehicle and nearby vehicle with road path in vicinity provided by digital road map to correlate positions of base vehicle and nearby vehicle with respective lanes of the road path. This method allows base vehicle to discern whether a nearby vehicle is moving on the same lane or different lane. When certain condition is satisfied, it also permits to determine specific lane location of base vehicle and sometimes specific lane location of nearby vehicle as well. The method takes advantages from several aspects to work properly. One aspect is that only lane locations of base vehicle and vehicle in proximity really matter for purpose of road safety enhancement, thus not necessary to determine lane location of a vehicle outside the mattered area. Another aspect is that GPS positioning error within a small vicinity is very consistent, thus relative positions of base vehicle and nearby vehicle having much higher accuracy than their absolute positions. The other aspect is that road path in a small vicinity mattered for the purpose is close to a straight path.

GPS-update-interval speed positioning provides a method to use speed obtained from speedometer of vehicle to calculate latest position in conjunction with road path that the vehicle is moving along during updating time interval of GPS positioning. Because speedometer responds fast to speed variation and is sufficiently accurate, the method can provide up-to-time positioning data starting after one GPS location is measured and ending when next GPS location is measured, then repeating that for next updating time interval of GPS receiver. Since the method only has to calculate vehicle positions during GPS updating time interval, which is typically several seconds, accumulation of positioning error in such short term is insignificant to positioning accuracy needed for purpose of road safety enhancement. The method gives a solution to reliably update vehicle location during update time interval of GPS receiver.

In accordance with the invention, the disclosure presents a method of vehicle traveling data broadcasting, in which a mobile communication device carried with a vehicle obtains vehicle moving data and broadcasts vehicle traveling data comprising the moving data through radio transmission for nearby vehicle to receive. The mobile communication device obtains vehicle location data from GPS measurement and speed of vehicle through image capturing and recognition of speedometer of the vehicle. Furthermore, the mobile communication device may use GPS-update-interval speed positioning to refresh position data more frequently than GPS update rate. The inter-vehicle sharing of vehicle moving data with accurate speed and high position refreshing rate forms a solid ground of information to achieve reliable and timely responsive road hazard warning for road safety enhancement. Driver's intended or going-on steering action, if available, may be included in the broadcasted messages in additional to the moving data. Driver's intended steering action such as left or right turn indication presented on instrument cluster may be obtained by the MCD using imaging capturing and recognition of instrument cluster. Driver's going-on steering action may be obtained by the MCD, which is placed in such way that it tilts in coupling with steeling wheel rotation, using image capturing of instrument cluster and tilted angle recognition of the captured image.

In accordance with the invention, the disclosure further presents a method of road hazard early warning, in which a mobile communication device (MCD) carried with a base vehicle receives moving data of nearby vehicle that is broadcasted through radio transmission and keeps tracking moving status of nearby vehicle, and, determine potential collision or other road hazard involving with nearby vehicle according to moving status of base vehicle. Image capturing and processing of speedometer of vehicle by a mobile communication device may be used to get speed of vehicle to facilitate the road hazard determination. Relative positioning map-matching lane correlation may be used to improve accuracy and reliability of road hazard early warning. Driver's currently going-on or intended steering action such as left/right steering or acceleration/deceleration, if available, may be taken account of determining potential road hazard in conjunction with moving data of vehicle. Driver's steering action may be obtained by a mobile communication device (MCD) coupled with movement of steering wheel to capture images of instrumental clusters of vehicle using onboard camera of the MCD and process captured images to detect the movement of steering wheel or speed indication of speedometer. Driver's intended steering action may be obtained by detecting left/right turn indication on instrumental cluster through image capturing and processing thereof. If a potential road hazard is determined, driver is given appropriate warning in audio form, visual form or combination thereof to take avoidance action. Regardless of whether a potential road hazard is found or not, the method may present location of nearby vehicle relative to base vehicle in either audio form, visual form or combination thereof in order for driver to get better situation awareness of nearby road usage. Audio form may be provided through either onboard speaker of the MCD or an external speaker coupled with the MCD. Visual form may be provided on either display screen of the MCD or an external display coupled with the MCD, such as vehicle mounted display, HUD (head up display), display of other device, and so on.

In accordance with the invention, the disclosure further presents a method of driving action warning, in which a mobile communication device (MCD) on board a base vehicle detects driver's driving action through image capturing and recognition of instrument cluster of base vehicle and evaluate potential road hazard or collision to be caused by the driving action by analyzing the driving action in conjunction with traveling status of base vehicle and nearby vehicles. Once driver's driving action is found dangerous, the MCD is to immediately alert driver to correct the driving action. The method is advantageous in avoiding driver initiated road hazard.

In accordance with the invention, the disclosure further presents a method of road navigation enhancement, in which a mobile communication device on board a base vehicle may perform relative positioning map-matching lane correlation by utilizing position data of nearby vehicle received through inter-vehicle communication to determine lane location of base vehicle and/or GPS-update-interval speed positioning to get more timely updated position data of base vehicle, and, then, use the lane location and/or the timely updated position data to enhance road navigation. With lane location available, road navigation can give driver more precise and more detailed steering instruction. With position data refreshed more frequently, road navigation is more responsive to give corrective road guidance when incompliance to road guidance occurs. The method may also use driver's steering action such as left/right steering or acceleration/deceleration, if available, to enhance road navigation. Driver's steering action may be obtained by a mobile communication device (MCD) coupled with movement of steering wheel to capture images of instrumental cluster of vehicle using onboard camera of the MCD and process captured images to detect the movement of steering wheel or speed indication of speedometer. Analyzing continuous steering actions over a time span after initialization can determine whether vehicle is making lane shift, road turn, or other change of movement. The method allows real time response of road navigation to driver's steering action. Furthermore, driver's driving action including acceleration/deceleration, intended left/right steering indicated by indication of left/right turn signal, and going-on steering action indicated by steering wheel rotation may be used to determine driving compliance to navigation instructions and notify driver to correct if noncompliance is found.

In accordance with the invention, the disclosure further presents a method of autonomous road assistance, in which a mobile communication device carried with a vehicle detects light-on indication of vehicle status indicators through image capturing and recognition of instrument cluster of the vehicle, and then, notify a server through wireless communication network regarding to error indicated by any light-on indication, and, after that, may receive assistance instruction from the server for driver to take proper measure. The server may also notify service professional to contact driver for road assistance or necessary vehicle service.

BRIEF DESCRIPTION OF THE SEVERAL VIEWS OF THE DRAWINGS

It should be understood that the brief description of the several views of the drawings is only for the purpose of presenting a concise reference to accompanying drawings and should not be inferred to have any suggestion to limit or reduce the scope of invention. Furthermore, the concepts and embodiments of the invention explicitly or implicitly shown in the drawings are only possibly understood accordingly by referring to following detailed descriptions upon illustrative showings of the drawings. For illustrative purpose, the drawings are not in scale. In the drawings.

DETAILED DESCRIPTION

Figure 1:
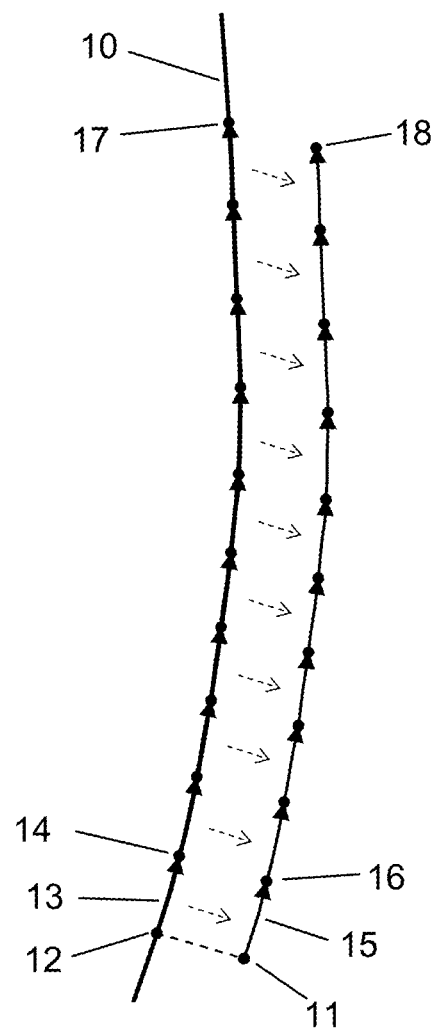
FIG. 1 is an illustratively showing to facilitate understanding of principle of GPS-update-interval speed positioning.

In accordance with the invention, principle of GPS-update-interval speed positioning is to use speed data of vehicle in conjunction with road path data of digital roadmap to calculate positions of vehicle between two consecutive GPS measurements. Fundamental of the principle is to, during GPS update interval, correlate vehicle movement along road path calculated by speed and very small time interval with available GPS measurement to determine location of vehicle in GPS coordinates or other geographic coordinates. For a GPS update interval, the speed positioning starts from an entry point on the road path that corresponds to an entry location. At beginning of GPS update interval, the entry location is latest GPS measured location. The entry point may be determined as the closest point on the road path to the GPS measured location because, due to limited positioning accuracy of GPS measurement, GPS location often falls close to by not right on the road path. Other sophisticated algorism to match a point on road path of digital road map with a GPS location may be used as well if it is reasonably justified for intended purpose. After a very small time interval, also referred as step time, following the latest GPS measurement, speed data of vehicle is obtained. Then, the traveling distance, also referred as step distance, made by vehicle during the step time is calculated using speed times time interval method or other applicable method. Matching the step distance along the road path from the entry point gets an end point on the road path that is taken as current road path point of vehicle. After that, relative positional vector between the entry point and the end point is retained and applied with the latest location corresponding to the entry point to get a new location corresponding to the end point. The new location is treated as current or new location of vehicle and may be expressed in the same coordinate format as GPS location. Accordingly, the procedure is repeated in the same way to obtain location of vehicle after another step time. By continuously repeating the procedure until next GPS measured location is available, a series of locations during the GPS update interval is obtained with each representing the location of vehicle at its corresponding specific time. When next GPS measured location is obtained, it is used as entry location for next cycle of GPS-update-interval speed positioning. Therefore, location of vehicle during two consecutively measured GPS locations can be determined in timely manner for road safety enhancement. It is recognizable that the step time may be so small that speed variation during the step time becomes ignorable for calculating the corresponding step distance. Furthermore, it is to be recognized that, because each cycle of GPS-update-interval speed positioning only lasts to occupy time interval of two consecutive GPS measurements, which is typically several seconds, overall error through aggregation of many step distances is within positioning accuracy needed for purpose of road safety enhancement. The above description about GPS-update-interval speed positioning may be appreciated more easily by referring to illustrative showing of the drawing of FIG. 1. According to the drawing of FIG. 1, dot 11 represents a latest GPS measured location, also referred as entry location, before a cycle of GPS-update-interval speed positioning starts. Dot 12 represents a entry point on road path 10 corresponding to the entry location. Arrowed line 13 along path 10 represents the first step distance of the cycle. The arrowed line follows the road path with its fully straighten length equal to the step distance, thus may not be a straight line. Dot 14 is the end point of arrow line 13 on path 10, which represents road path point of vehicle at ending moment of the first step time. Arrow line 15 is a vector same of arrow line 13 but dislocating to have its starting end placed right on dot 11, which gets the other end on dot 16. Thus, dot 16 represents location of vehicle at ending moment of the first step time. Accordingly, other arrow lines along road path 10 respectively represent step distances for following consecutive step times. Each one of the ending dots on road path 10 of these arrow lines represents correspondingly road path point of vehicle at ending moment of one step time. Arrow lines with their ends connected each other having their beginning end overlapped with dot 16 correspond one by one to the other arrow lines along road path 10. The dots on the arrow lines starting from dot 16 represent respectively locations of vehicle at ending moments of following consecutive step times. In the illustrative showing, dot 17 is illustratively used as road path point of vehicle at ending moment of last step time before next GPS measured location is available. Correspondingly, dot 18 represents location of vehicle at that moment. Depending on purpose or need of application, road path points of vehicle during GPS update interval may be used as location of vehicle, thus not necessary to obtain their corresponding locations of vehicles as described above. It is emphasized that the illustrative showing is to facilitate understanding of the principle of GPS-update-interval speed positioning and should not be construed as only way to implement thereof.

Figure 2:
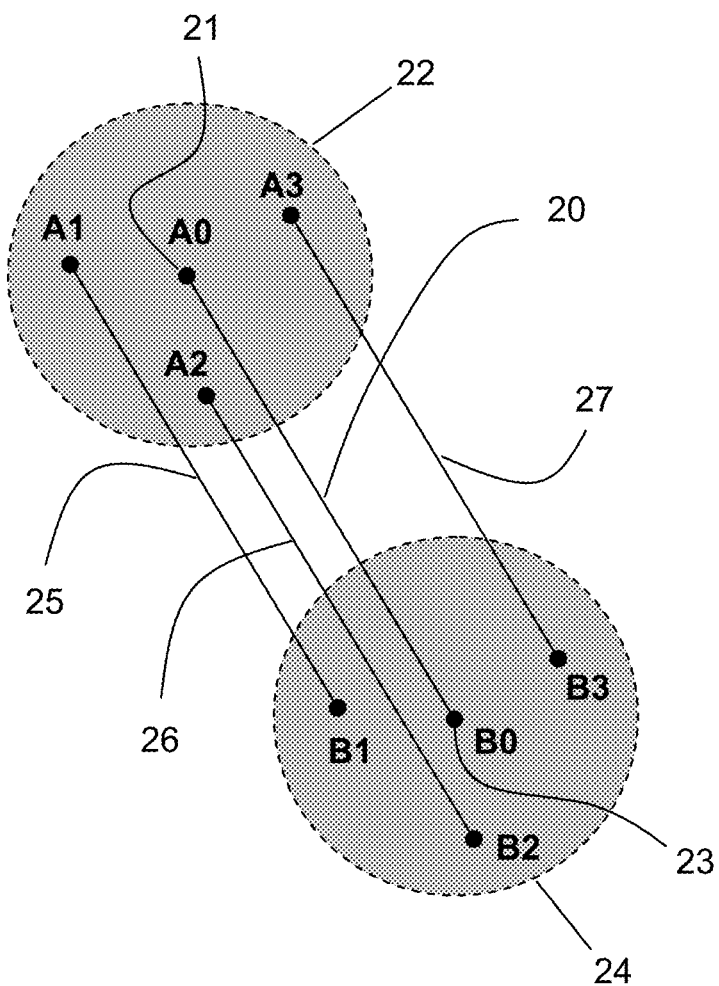
FIG. 2 is an illustratively showing of fundamentals of principle of relative positioning map-matching lane correlation.

In accordance with the invention, principle of relative positioning map-matching lane correlation is to take advantage of much higher accuracy of relative positions between two GPS locations in proximity than their absolute positions to correlate the relative positions with lane distribution of road path through matching with digital roadmap. For most GPS receiver commonly seen on civilian ground vehicles, GPS accuracy is primitively limited by ionosphere delay, which is caused by ionosphere to distort GPS signal during its transmission from GPS satellite to ground. For two GPS receivers in proximity, for road safety purpose about or less than one hundred meters apart, their GPS measurements suffer almost exactly the same sources of error at almost equal magnitudes, thus respectively having almost the same dislocation error off their true positions. Thus, their relative positions between their measured GPS locations has much higher accuracy. The fact may be understood more obviously be viewing illustrative showing of the drawing of FIG. 2. According to the drawing, two GPS receives have their true locations A0 and B0 respectively located on point 21 and point 23, having their relative positions represented by line 20. Shaded circular area 22 and area 24 represent possible distributions of their GPS measured locations, which is determined by GPS positioning error. Although their GPS locations may be anywhere in the shaded areas, their relative positions remains very closely the same as their true relative positions. For example, one set of GPS locations has one location A1 and the other location B1, each located within the corresponding shaded area. The relative positions between location A1 and B1 is represented by line 25 between them. Another set of GPS locations has one location A2 and the other location B2, having their relative positions represented by line 26. The other set of GPS locations has one location A3 and the other location B3 having their relative positions represented by line 27. Since relative positions between two GPS locations in proximity have very high positioning accuracy, line 25, line 26, line 27 are substantially parallel to each other and have the substantial same length, which are also substantially parallel to line 20 of true relative locations and have the substantial same length as line 20.

Figure 3A:
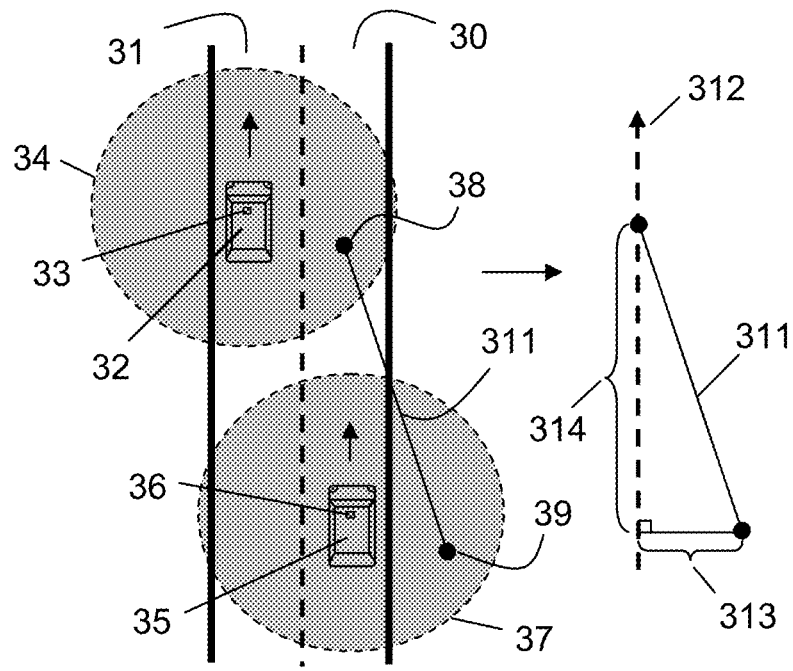
FIGS. 3A and 3B further illustratively shows the principle of relative positioning map-matching lane correlation FIG. 4A illustratively shows a way to use a mobile communication device (MCD) to take image of instrument cluster of a vehicle which the MCD is onboard, in accordance with the invention.

When GPS location itself has insufficient accuracy to determine lane location on road path, it is possible to use the relative positions of two nearby vehicles in conjunction with lane distribution of local road path provided by digital road map to determine whether the two vehicles are moving along the same lane or different lanes. For certain situation, specific lane location of each vehicle may be determined as well. For example, if local road path has two lanes and two vehicles are moving along different lanes, the vehicle moving on left side of the other vehicle must be on the outer lane and the other vehicle must be on the inner lane. Referring to the drawing of FIG. 3A, vehicle 33 and vehicle 35 are moving along the same direction of local road path but on different lanes. The local road path has two lanes here, inner lane 30 and outer lane 31. Vehicle 32 moving on lane 31 has GPS receiver 33 onboard the vehicle. The GPS receiver periodically measures GPS location of the vehicle. Shaped area 34 represents scope of accuracy of GPS location, which is not sufficient to determine lane location of vehicle. Similarly, vehicle 35 with GPS receiver 36 onboard has its GPS location measurement fallen into shaded area 37. Typically, for purpose to determine whether two vehicles may have a potential collision under development, the two vehicles are not far apart each other, normally within a distance less than 100 meter. Within such small vicinity, GPS receivers 33 and 36 should receive the GPS signals from the same set of GPS satellite and rely on the same data sets to calculate its positioning output. As described in above paragraph, relative positioning information contained in GPS data sets for positioning measurements may potentially allow very precise measurement on their relative positions. Since the mattered distance between the two vehicles is so small that their relative positions may be precisely obtained by calculating relative vector between two GPS locations. Assuming, GPS receiver 33 outputs GPS location 38 for vehicle 32 and, at substantially same moment, GPS receiver 36 outputs GPS location 39 for vehicle 36, line 311 between location 38 and location 39 gives relative positions of two vehicles. Then, how to use the relative positioning information for lane recognition is illustratively shown on right side of the drawing. Arrow line 312 indicates direction of road path and line 311 has one end placed on arrow line 312. Then, the other end of line 311 is projected to arrow line 312 to get projected portion 314, which represent road path distance between the two vehicles. The closest distance from the other end to arrow line 312 is indicated by reference numeral 313, which represents traverse distance of the two vehicles. The traverse distance is used in conjunction with other information such as vehicle width, lane width, and/or road path distance to determine whether the two vehicles are moving on the same lane or on the different lane. If the traverse distance is larger than lane width, it is assured that the two vehicles are on different lanes. If the traverse distance is less than lane width but larger than vehicle width, it is most likely that the two vehicles are on different lanes assuming normal driver won't drive along divider line between two lanes. To have a tolerance, it is more appropriate to set criteria of lane determination as having the traverse distance larger than total of vehicle width and a safety spacing. For example, assuming a vehicle width 1.6 meters and a safety spacing 0.5 meters, the criteria is to have the traverse distance larger than 2.1 meters. The placement of GPS receiver in vehicle may also affect accurate value for the criteria. Thus, proper measure may be taken in implementation to assure that the placement is approximately consistent among vehicles so that varying of vehicle width is accommodated by the safety spacing to ensure reliability or accuracy of lane determination. For example, if a mobile communication device (MCD) containing GPS receiver is used for implementation, the MCD may be placed right in front of steering wheel both for convenience to driver and consistency of the placement of GPS receiver. An alternative way is to let each vehicle notify other vehicle, through inter-vehicle communication, its vehicle width or vehicle model so that its width may be retrieved from a storage database according to vehicle model. With width of other vehicle in hand, lane determination can be carried out more precisely. Furthermore, it is also possible to use a varying criteria for lane determination. For example, when road path distance is relatively sufficient for safe following distance depending on speed of vehicle, lane determination may use relatively loose criteria, which guarantees a certain probability of accuracy. When road path distance is close to danger following distance, lane determination must use strict criteria in order to give proper safety notice to driver. The criteria for lane determination may vary according to a variety of situations, which is best found out in experiments or simulation. But, the experiment or simulation should be within normal challenge or workload for an ordinary skilled in the art under teaching and suggestion provided in the disclosure to carry out.

Figure 3B:
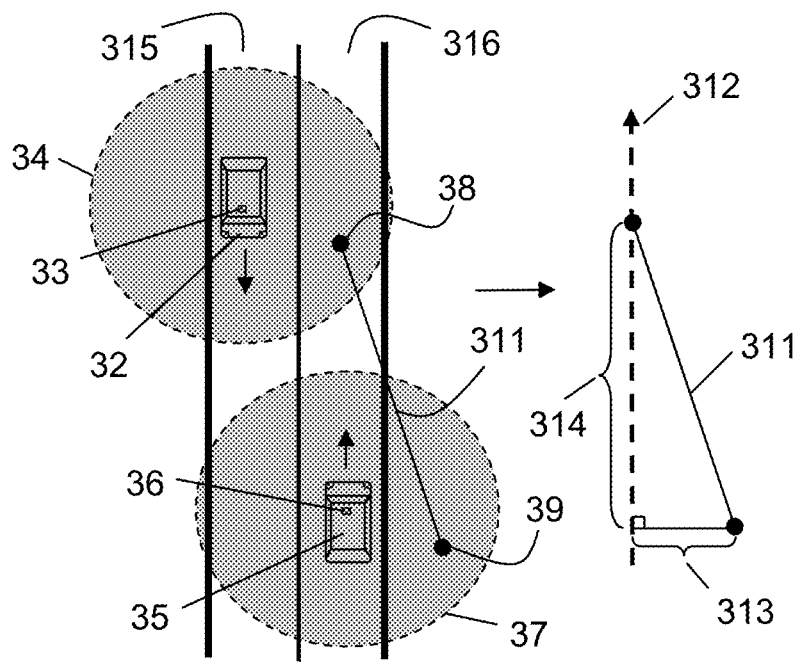

Accordingly, the principle of relative positioning map-matching lane correlation is also useful to determine whether a vehicle moving in opposite direction along road path crosses road divider line, thus causing potential collision with a vehicle moving on opposite side. As illustratively shown in the drawing of FIG. 3B, vehicle 32 and vehicle 35 are moving oppositely on the same road. Vehicle 32 is on lane 315 and vehicle on lane 316. For the purpose, only two vehicles on most outer lanes of their respective road sides may have a collision when one vehicle crosses road divider line. Although the drawing only shows one lane on each side of road, lane 315 and lane 316 could be viewed as most outer lane of their respective sides of road. In accordance with the description above about the principle, traverse distance 313 of relative positions of the two vehicles is used to determine whether the two vehicles may have a potential collision under development. The criteria is to make sure passing distance between the two vehicles is larger than a predetermined safe spacing. Placement of GPS receiver on vehicle becomes very critical for the potential collision determination. One way is to set a standard procedure to place GPS receiver consistently on vehicle. Thus, side distance from GPS placement to driver side wall of vehicle is predetermined. So, the criteria may be set as the traverse distance should be larger than total of both side distances of GPS placements on the two vehicles and a passing safe spacing. The passing safe spacing is zero when the two vehicles barely pass each other without collision. Typically, the passing safe spacing may be 0.5 meters. An alternative way is to let vehicle notify other vehicle the side distance of GPS placement. So, the criteria for determining opposite moving collision can be known accurately depending on vehicles involved. If a mobile communication device (MCD) containing a GPS receiver is placed in front of steering wheel as a standard practice, it is also possible to use a standard value for the criteria to work for most vehicles. Or, it is also possible to use a standard value from a storage database according to vehicle model of the other vehicle, which is known by letting each vehicle notify other vehicle its vehicle model through inter-vehicle communication, for the criteria to work accordingly.

The principle of relative positioning map-matching lane correlation requires that two GPS locations used thereof are measured as concurrently as possible because factors causing positioning error vary time to time. The more concurrent the two measurements are, the more accurate their relative position is. Thus, output of relative positioning map-matching lane correlation is more accurate. A variety of ways may be used to get more concurrent GPS locations for performing relative positioning map-matching lane correlation. One way is to find most concurrent GPS location data from stored previous location data if latest location data are not the most concurrent location data. However, this way assumes vehicles involved for the lane correlation do not change their lanes frequently, which may be valid for most road situations but not for all. Another way is to synchronize GPS measurements, carried out by different GPS receivers on board different vehicles respectively, by using GPS time contained in GPS signals. Because GPS time is consistent, the GPS receivers may be configured to have their measurements effectively outputted concurrently according to GPS time. Therefore, GPS locations measured by different receivers on different vehicles may be very much concurrent each other to the extent of time accuracy of the synchronization.

Having moving status of vehicle is essential for road safety enhancement. GPS provides positioning of vehicle. Based on GPS locations of vehicle for a time span, moving direction along road path can be determined in conjunction with digital roadmap. Once the moving direction is identified, vehicle is reasonably believed to retain the moving direction until next road intersection is reached. This indicates that moving direction along road path does not change frequently. It is well suitable for GPS based direction determination to meet need of road safety enhancement. Speed of vehicle can be obtained using GPS locations over a time span as well. But, the speed obtained from GPS locations is average speed over the time span. It is often taking relatively long time to determine the speed, otherwise incurring too much speed value fluctuation. This limitation makes the speed obtained from GPS locations experience a significant delay on real speed change and incapable of reflecting suddenly changing of speed. Therefore, an alternative way to obtain speed of vehicle more accurately in timely manner is in great demand for road safety demand. Furthermore, GPS data is not capable of telling driver's steering action in real time until afterward positioning of vehicle indicts change of moving status caused by the action, which is too late for road safety warning if potential accident is involved. To meet the demands, the disclosure presents a method using image capturing and processing of instrumental cluster comprising speedometer to obtain speed of vehicle, assuming speedometer responds fast to speed changing and gives accurate speed data or value, and detect driver's steering action currently going on or intended to take.

Figure 4A:
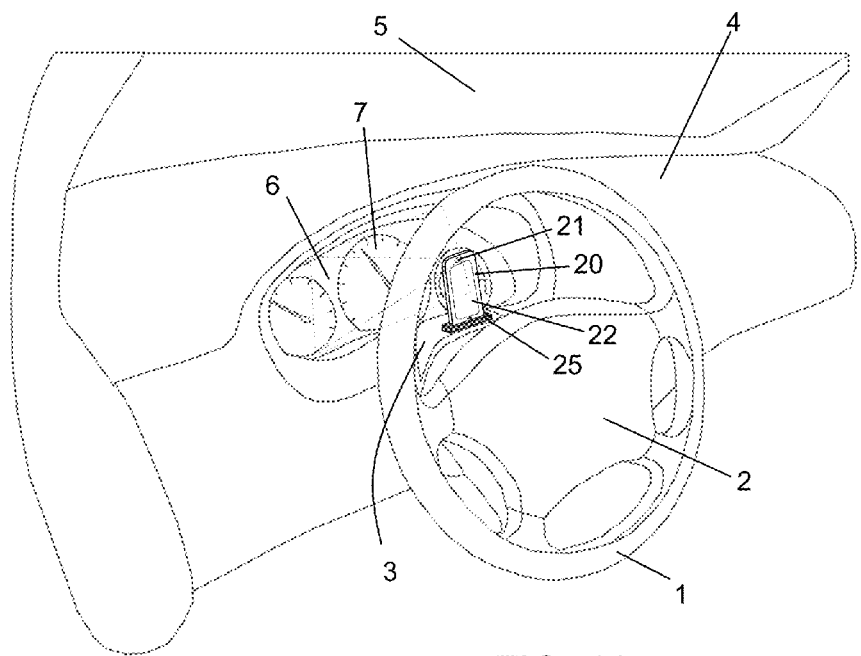
FIG. 4B gives an example to illustrate arrangement of meters and indicators on instrument cluster.
FIG. 4C illustrate an example of display on instrument cluster to display barcode pattern or the like having speed indication of speedometer and, if applicable, other moving related information encoded thereon to facilitate image recognition, in accordance with the invention.
Figure 4B:
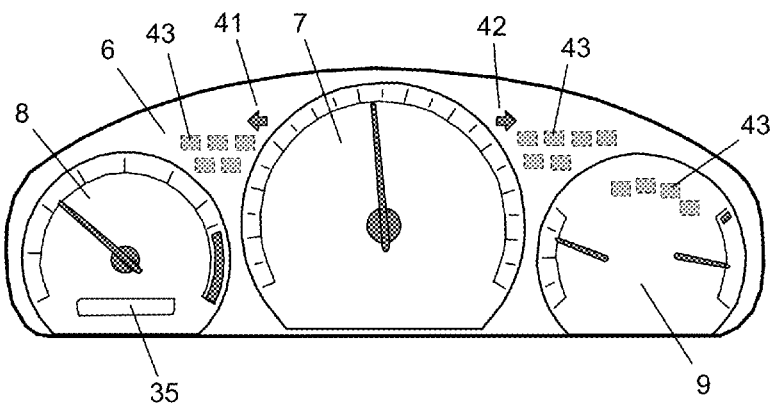

In accordance with the invention, a mobile communication device (MCD) having a digital camera and a GPS receiver contained or coupled with is used on board a vehicle for road safety enhancement. The MCD obtains GPS location of the vehicle from the GPS receiver. The GPS location may be converted to other coordinate format for use of road safety enhancement. In order to obtain more traveling information of the vehicle, the MCD with onboard camera may be placed on a location inside the vehicle that gives clear sight of view for the camera to take unobstructed image of major portion of instrumental cluster of the vehicle. For a MCD coupled with a stand alone digital camera, the camera should be placed thereof for the same purpose. For convenience, we use MCD with onboard digital camera in following description as examples to illustrate possible embodiments of the invention. To get unobstructed sight of instrumental cluster, it is preferred to place the MCD in front of steering wheel, as illustratively shown in FIG. 4 A. In the showing of FIG. 4A, a mobile communication device 20 is placed on a base holder 25 with onboard camera 21 facing instrument cluster 6 of vehicle. Base holder 25 holds device 20 when the device is installed on the base holder. Base holder 25 is firmly attached on or incorporated by column portion 3 connecting steering wheel portion of vehicle with front cabin portion of vehicle, which further comprises steering wheel 1 and central portion 2. Instrument cluster 6 is typically located on driver's side of dashboard 4 and normally directly facing driver and right underneath driver's sight to observe road through windshield 5 during driving. All driving related information for driver is provided by indications of meters and status indictors of the instrument cluster. Different vehicle has different structure and display arrangement of instrument cluster. But, for driving safety, speed of vehicle is always displayed in most obvious location, normally central location where speedometer 7 is illustratively shown in the drawing. Being next most important information to be displayed, left or right turn indicator is normally placed adjacent speed indication, thus making it equally easy for driver to see. Thus, camera 21 can easily have the most important driving information such as speed indication and left and right turn indicators included in its field of view. Steering wheel is structured not to obstruct driver's view to instrument cluster. So, display screen 22 of MCD 20 is facing right to driver, thus very suitable to display road safety information for driver's attention. FIG. 4B illustratively shows an example of instrument cluster of vehicle, which includes common driving information provided to driver. In the showing of FIG. 4B, instrument cluster 6 has center allocated to speedometer 7 and tachometer 8 and auxiliary gauges 9 respectively allocated on left and right sides. Left turn indicator 41 and right turn indicator 42 adjacent speedometer 7 are placed in upper position, which makes them obvious for viewing. Vehicle status indicators 43 are dispersed in unoccupied areas of upper portion of instrumental cluster. Odometer and trip meters 35 is placed in lower portion of tachometer 8 since it is relatively less used. By capturing image of at least major portion of instrumental cluster, the MCD can have access to driving information and some vehicle system status of vehicle. It is preferred for the MCD to be able to capture full image of instrument cluster if the MCD is in use for road autonomous assistance, which desires to access all displayed information on instrument cluster.

Figure 4C:
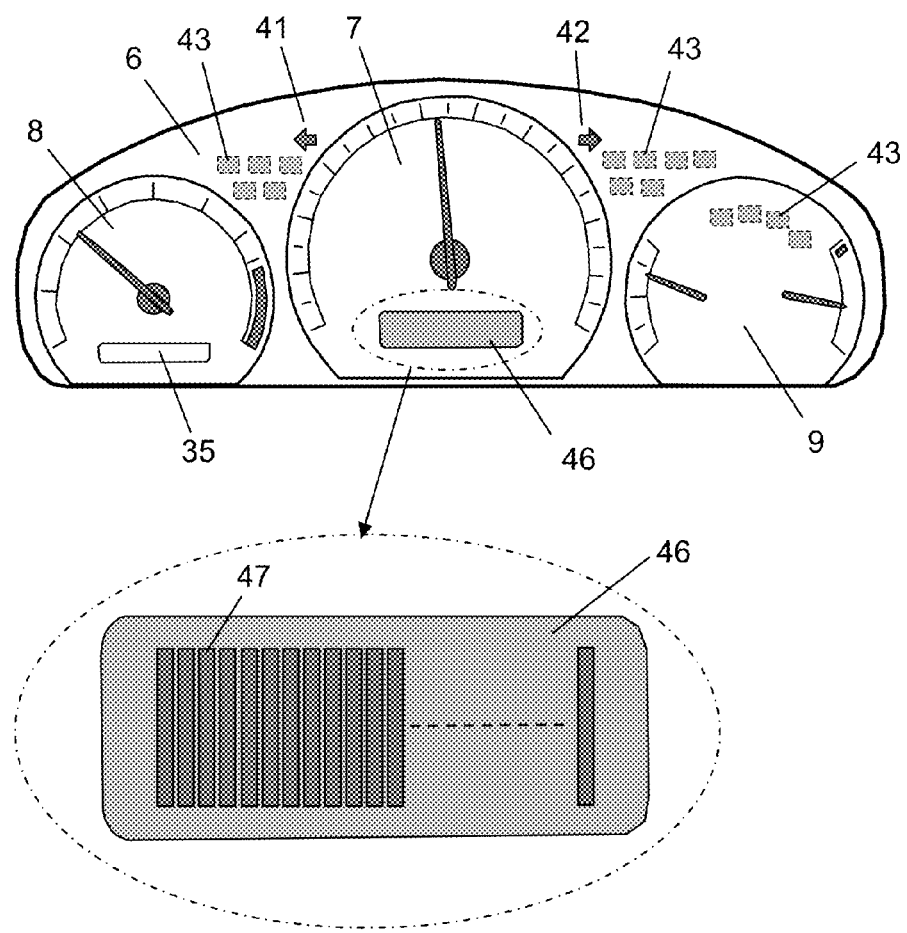

After image of instrument cluster is captured, the MCD processes the image using image processing and recognition techniques to retrieve the driving information and, if applicable, vehicle system status information as well. The driving information includes speed data indicated by speedometer and left or right turn indicator. If vehicle has more driving information displayed on instrument cluster, it may be retrieved for road safety enhancement as well. To facilitate the retrieval of vehicle information from image of instrument cluster, a display panel may be installed on instrument cluster to show a bar code pattern or the like that have a portion of or all vehicle information encoded thereupon. So, the vehicle information encoded may be easily, reliably, and quickly retrieved from captured image containing the bar code pattern. It may significantly improve response time and accuracy of road safety enhancement based on the information. The display panel may be a LCD type display, OLED type display, LED matrix display, Plasma display panel, or electrophoretic display or the like. If only portion of vehicle information is encoded, driving information at least including speed data should be encoded first. If more information may be encoded upon, it is preferred to have following information added in priority as described sequence: left/right turn indicators, engine status indicator, tachometer indication, indications of auxiliary gauges and other status indicators. FIG. 4C illustratively shows an example of the display panel on instrument cluster. In the showing of FIG. 4C, a bar code display 46 is installed under indicator of speedometer at center of instrument cluster 6. As shown in enlarged view, display 46 is made of a row of bar pixels 47, best suitable for displaying one-dimensional bar-code pattern or the similar pattern. Such pixel configuration reduces cost of making the display. There are a variety of ways to make the display cheaply. One way is to make a LCD display or OLED display with pixels patterned as bar shape. Another way is to use a matrix of LED to form the display. The other way is to assemble many bar-shape lighting units together to form a row of bar-shape pixels.

Figure 5A:
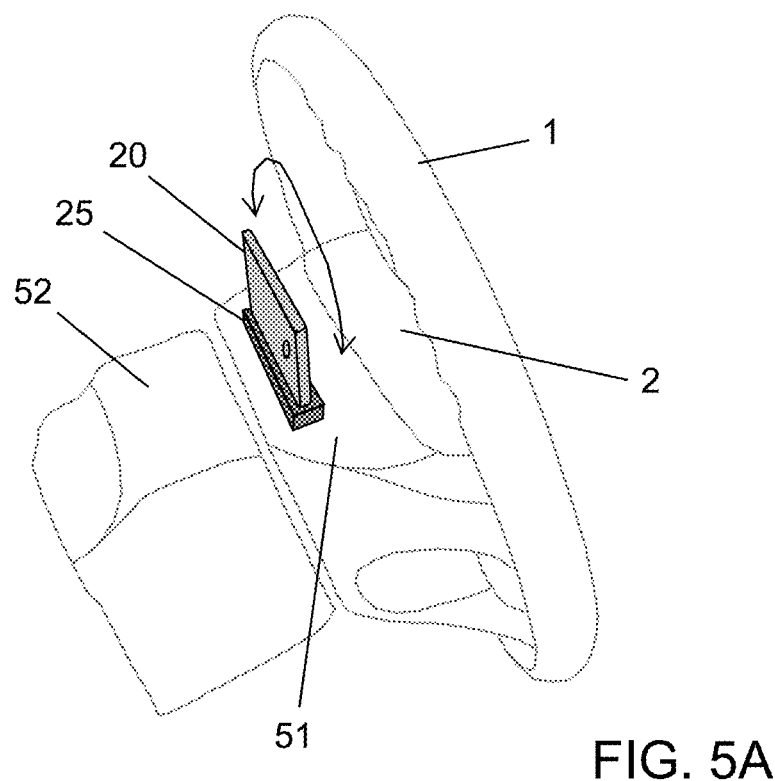
FIGS. 5A and 5B illustratively show two possible ways to place the MCD in front of steering wheel, in accordance with the invention.

Furthermore, the captured image of instrument cluster may be processed to detect steering wheel rotation if placement of the MCD makes it tilt correspondingly with rotation of steering wheel. In an example illustratively shown in FIG. 5A, MCD 20 is placed on support portion 51 which fixingly connects to central portion 2 of the steering wheel portion and rotates in together with steering wheel 1. MCD 20 may be inserted into or held by base holder 25, which in turn is firmly attached on or incorporated by support portion 51. Support portion 51 is in fixing connection with the steering wheel and rotates in together with steering wheel 1 relative to base portion 52, which holds the support portion and rigidly connects with front cabin portion of vehicle (not shown). When driver rotates the steering wheel to go left or right, the MCD moving with the steering wheel causes its captured image of instrument cluster tilted accordingly. Imaging processing technique may be used to process the captured image to detect the tilted angle, then getting corresponding rotation angle of the steering wheel. Thus, with the disclosed technique, the MCD can obtain driver' steering action on driving the vehicle. In conjunction with speed of vehicle and time duration, the rotation angle may be used to determine in real time whether vehicle shifts lane or makes a turn.

Figure 5B:
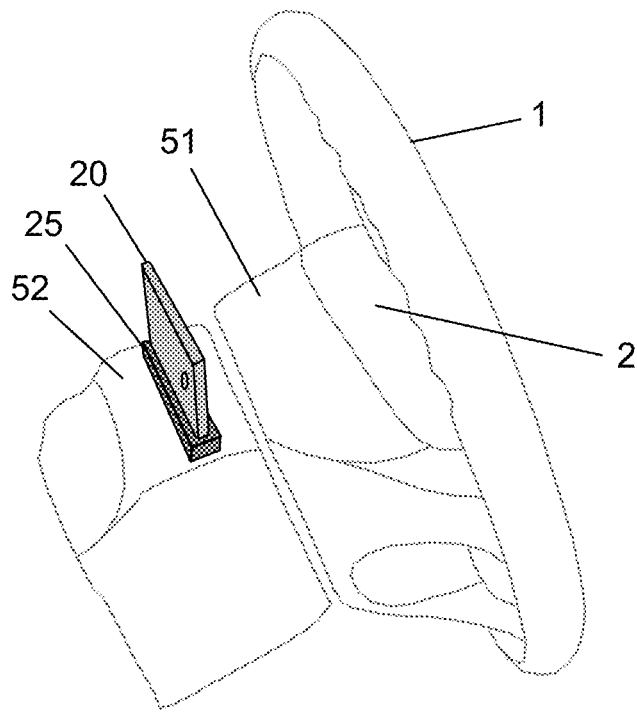

If driver's steering action is not in use for application, the MCD may also be placed on base portion 52, illustratively shown in FIG. 5B. In this case, base holder 25 holding MCD 20 may be attached firmly on or incorporated by base portion 52, which is fixed relative to the dashboard. Thus, tilted angle of captured image of instrument cluster is not changing in use, thus making imaging processing relatively simpler and faster.

In followings, we are going to discuss, in details, methods of using the mobile communication device for road safety enhancement.

In accordance with the invention, a method of vehicle traveling data broadcasting using the mobile communication device (MCD) to broadcast traveling data of vehicle through inter-vehicle communication for road safety enhancement generally obtains vehicle traveling data and broadcast the same through radio transmission. Vehicle traveling data comprises vehicle moving data, and may further comprise vehicle steering data. Vehicle moving data comprises positioning data and speed data, and may further comprise direction data representing moving direction along road path. Vehicle steering data includes at least either indication data of left or right turn signal or steering action data. The MCD obtains element data of vehicle traveling data configured to be shared with other vehicle and broadcasts the vehicle traveling data comprising the element data through radio transmission. The radio transmission follows a protocol of inter-vehicle communication for other vehicle to receive and decode the radio transmission. The MCD embodies radio transmitter to send out the radio transmission and radio receiver to receiver similar radio transmission from other vehicle. The radio transmitter and receiver are internally connected through communication interface with processor of the MCD to carry out their functions. The processor of the MCD coordinates complete process of vehicle traveling data broadcasting and performs computing necessary to complete the process. The processor of the MCD also coordinates processing of receiving traveling data broadcasted from other vehicle and performs necessary computing to retrieve the traveling data from received radio transmission. It is possible to incorporate specialty IC chip responsible for hardware encoding and decoding of radio transmission into the MCD to alleviate computing load on the processor.

In accordance with the invention, The positioning data is primitively obtained from GPS receiver accessible by the MCD. During GPS update interval, the positioning data may be obtained using the GPS-update-interval speed positioning disclosed above in the disclosure. Each broadcasted positioning data is in form of a set of location data and time data, in which the location data is latest location measurement of vehicle and the time data is the valid time of the location measurement. Presence of the time data in broadcasted positioning data is considered as a considerable improvement to road safety enhancement. First, receiving vehicle may get aware of broadcasting vehicle's position more precisely because time delay caused by process of fulfilling the inter-vehicle traveling data sharing does not have detrimental effect on positioning anymore. For example, when location of vehicle is measured, the time data of completing the measurement is provided in conjunction with the location data to processor of the MCD for broadcasting. The processor takes necessary and proper processing for radio transmitter to broadcast. Depending upon protocol of inter-vehicle communication and real-time communication traffic load, the radio transmitter may be able to send the broadcasting into radio transmission immediately or may have to wait for its allocated time slot. When radio receiver of receiving MCD receivers the radio transmission, there may be a considerable time delay. Considering possible fast speed of moving vehicle, broadcasting vehicle may have moved a considerable distance during such period of the time delay. With the time data available to receiving vehicle, it allows receiving vehicle to correct the effect of the time delay. The time delay is known by comparing current time with the time data received in together with the location data. Speed of vehicle may be known by consecutively tracking the vehicle or directly obtained from broadcasted traveling data. The traveling distance during period of the time delay is readily available by the speed times the time delay. Since vehicle is constrained on road path provided by local digital roadmap, current location of broadcasting can be readily determined by correlating received location data on a point on local road path and matching the traveling distance along the road path from the point. Therefore, Having the time data in conjunction with the location data provided in positioning data broadcasting gives a practical solution for following road safety analysis to correct detrimental effect of possible time delay of inter-vehicle communication. Second, having the time data provided with its associated location data facilitates implementation of the relative positioning map-matching lane correlation disclosed above in the disclosure, which requires to ensure almost concurrently positioning of receiving vehicle and broadcasting vehicle. For example, when performing the lane correlation, with the time data available, receiving vehicle may use its stored location data to calculate relative positioning if the stored location data is found to be the most concurrent data with the location data received from broadcasting vehicle.

In accordance with the invention, the speed data of vehicle is obtained by the MCD using image capturing and recognition of speedometer of vehicle, as illustratively described above in the disclosure. Normally, speedometer of vehicle is accurate and responds quickly to speed change. For example, with careful calibration, speedometer can have accuracy about 1 mile per hour (MPH) or less, which corresponds to about 0.45 meter per second. When vehicle moves at speed 50 MPH, relative error on speed data is 2 percent or less, which is very small. When the speed data is used for GPS-update-interval speed positioning, the speed accuracy of about 1 MPH corresponds to error of accumulation about 0.45 meter per second. For 5-6 seconds GPS-update-interval, total error of accumulation is less than 3 meters, which is still acceptable for road safety enhancement. Therefore, the speed data of vehicle can sufficiently indicate current speed of vehicle and timely reflect sudden change of speed. The problem of slow response and inaccurate for GPS based speed data is no longer a problem for the speed data acquired through imaging capturing and recognition of speedometer. The direction data may be obtained by tracking vehicle's position evolution along local road path of digital road map. Alternatively, the direction data may be obtained by compass sensor that measures orientation of vehicle. Because vehicle is constrained on road path, direction data of movement does not have to be very precise. For road safety enhancement, it is only necessary to know which direction of road path vehicle is moving along. Further considering that vehicle is not to change its moving direction between two adjacent road intersections, direction data of vehicle movement is a slow changing parameter. Therefore, direction data by tracking GPS location varying along road path of digital road map is sufficient for the purpose thereof, thus preferable to that by using compass sensor.

In accordance with the invention, the vehicle steering data is obtained by the MCD using image capturing and recognition of instrument cluster of vehicle, as illustratively described above in the disclosure. The image capturing and recognition may be performed concurrently with that for obtaining speed data since speedometer is in part of instrument cluster. Generally, the vehicle steering data broadcasted is intended to report driver's intended or currently going-on steering action. Indication of left or right turn signal on instrument cluster, if lighted on, indicates driver's intention to steer vehicle toward left or right. The indication, if lighted on, retains its status until either driver cancels the signal or vehicle returns to straight course. It is not possible to tell whether driver is actually steering leftward or rightward by only depending on the indication. So, it is reasonable to treat the indication of left or right turn signal as driver's intended steering action. Such information, if detected by the image capturing and recognition, could be shared with other nearby vehicle through the inter-vehicle broadcasting. The MCD on receiving vehicle may display such information for driver's reference to be prepared for possible following course change of nearby vehicle. For some situations, for example, two vehicles side by side located on two neighboring lanes, the MCD on receiving vehicle may alert driver for possible side collision upon receiving intended steering action of broadcasting vehicle. Currently going-on steering action is obtained by placing the MCD in coupling with rotation of steering wheel, which is illustratively shown in example of FIG. 5A. The steering wheel rotation causes captured image of the MCD titled accordingly. Image recognition techniques can detect the tilted angle of captured image according to a predetermined image orientation, preferably the image orientation when steering wheel is in neutral or center position. The tilted angle is linked to rotation angle of steering wheel. By analyzing behavior pattern of steering wheel rotation in conjunction with moving status of vehicle and road path data provided by digital road map, it can determine what kind of steering action that driver is making. Such steering action data, once determined, is broadcasted for other vehicle in proximity for road safety enhancement. The MCD on receiving vehicle may display such steering action data for driver's awareness of course change of other vehicle, and, If potential collision is detected, alert driver for collision avoidance. When vehicle steering data is broadcasted, it may be indication of left or right turn signal or steering action data of steering wheel rotation. It is better to have type of vehicle steering data included in encoded signals for broadcasting. So, receiving vehicle could tell whether it is intended action or currently going-on action in order to use it more accordingly for road safety enhancement.

Figure 6:
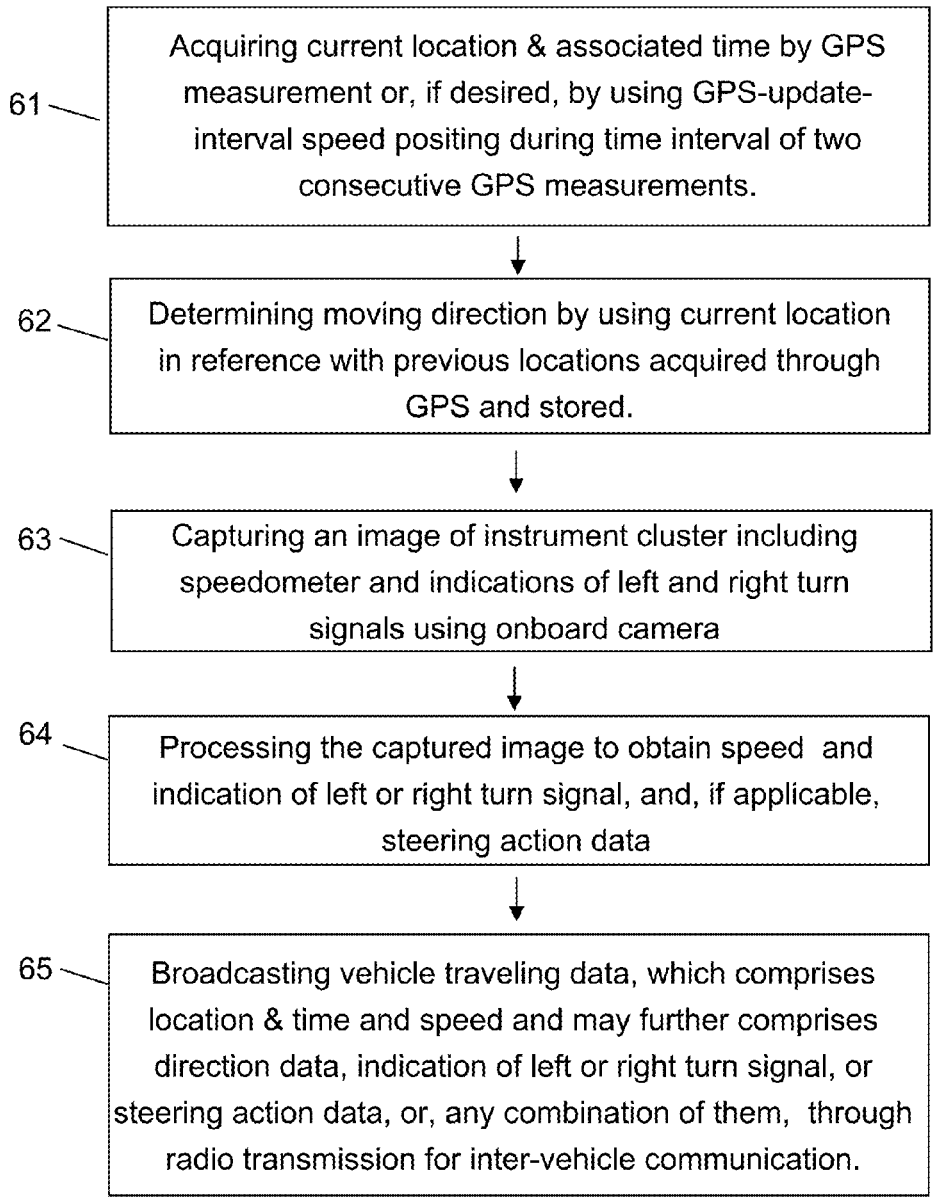
FIG. 6 is a flowchart illustratively showing a method of vehicle traveling data broadcasting for road safety enhancement, in accordance with the invention.

In accordance with the invention, the process of vehicle traveling data broadcasting is understood better by considering an embodiment of the process illustratively shown by the flowchart of FIG. 6. In the flowchart, referring to step 61, the embodiment of the process starts with acquiring current location data and its associated time data by GPS measurement carried out by GPS receiver. The acquiring may use GPS-update-interval speed positioning to get the location data and the time data after latest GPS measurement but before next GPS measurement data is available. If GPS measurement is updated sufficiently fast, at least better than once per second, GPS-update-interval speed positioning may not be much useful, but still applicable to improve performance upon. Otherwise, it is preferred to have GPS-update-interval speed positioning used to provide more accurate positioning data during two consecutive GPS measurements. Referring to step 62, moving direction along road path is determined by comparing latest GPS location with GPS location previously measurement and stored in data storage such as memory or hard driver. As forementioned, moving direction constrained by road path does not need very fast updating, thus using GPS location tracking to determine that is sufficient. The direction data to be included in traveling data broadcasting does not have to be in form of capable of giving direction in high resolution. It is only necessary to have the direction data given in form that is sufficient to determine vehicle moving direction along road path of digital road map, for example, northbound of I-95 or southbound of I-95. So, moving direction obtained by GPS location evolution should be processed in context of local road path to extract necessary information indicating road path direction that vehicle is moving at. Direction data in accordance with the moving direction contained the necessary information, and, then is broadcasted for other vehicle to tell which direction of road path the vehicle is moving to. Because road safety enhancement is performed in context of local road path, the direction data is sufficient in detail for purpose thereof. It is possible that direction data updates not as frequently as positioning data, but once for every several acquirements of positioning data. Referring to step 63, an image of instrument cluster comprising speedometer is captured by the MCD using onboard camera. Depending on what information is to be retrieved from displaying of instrument cluster, only portion of instrument cluster containing the information is necessarily taken in the captured image. In the embodiment of the process, indications of left and right turn signals are taken in the captured image. It is probably true that capturing image of speedometer may easily have indications of left or right turn signals contained in the image since speedometer and the indications are normally place in close proximity on instrument cluster. The MCD may be placed as illustrative showing of FIG. 5A or 5B. If steering wheel rotation is desired to be obtained from the captured image, the MCD should be place in coupling with steering wheel rotation, which is as illustrative showing of FIG. 5A. Referring to step 64, the captured image is processed by the MCD to retrieve speed data indicated by speedometer and, if desired, indication of left or right turn signal. If applicable, steering wheel rotation is obtained as well, using image recognition for image tilt angle. The steering wheel rotation is analyzed to determine corresponding steering action data. Depending on preference to share steering action data, indication of left or right turn signal or steering action data or both may be included in vehicle steering data of traveling data broadcasting. The steering action data may be given in form of left steering or right steering, or, left turn or right turn, not necessary to have more steering detail provided thereon. A steering pattern analysis should be performed to determine whether it should be treated as steering or turn. Because vehicle traverse movement depends on speed of vehicle, steering wheel rotation should be analyzed in conjunction with speed of vehicle. A small angle of steering wheel rotation at certain high speed is sufficient to tell that driver is shifting lane, assuming straight lane on local road path. In such case, integral of steering angle over a short time span may be a good indication whether such lane shift is undergoing. Steering angle going toward one side for a short time span and then going toward the other side for a short time span may be a good indication that such lane shift is completed. Steering action data for such case is treated as left steering or right steering. When steer wheel is rotated beyond a certain angle, it is possible that the MCD may move out of direct sight to instrument cluster. In such case, the very large steering angle is undoubtedly indicating that driver is making a turn. Steering action data for such case is treated as left or right turn. For steering angle in between, whether driver is making a steering and a turn may be determined by analyzing steering pattern of steering angle varying over time span in conjunction with speed of vehicle and road path of digital road map. One algorism is given here as an example for such steering pattern analysis. In the algorism, steering angle in conjunction with speed of vehicle can be used to obtain traverse speed component. Integral of traverse speed component over time span could tell how much traverse distance is made. Considering the traverse distance in context of road path may tell whether driver is making a turn. If traverse speed component is large enough, it may be sufficient to tell a turn is undergoing. It is recognizable that determining steering pattern for a road turn is readily available for ordinary skilled in the art to find out under reasonable work load of experiment or simulation upon reference to teaching and example of the disclosure. Discriminating a steering from a turn helps to improve road safety enhancement near or at road intersection. When driver is making a turn at road intersection, other vehicle traveling on road path that driver is turned toward may get caution on that, especially when it is close to the intersection. When driver making a steering at high speed when approaching road intersection, it is indicating that driver is prepared for a road change. Vehicle going to make the same road change may get awareness of that. Referring to step 65, vehicle traveling data is broadcasted through radio transmission for inter-vehicle communication. The vehicle traveling data at least includes the location data and the time data and the speed data, may further include the direction data. If available, the indication of left or right turn signal or the steering action data or both may be included in the vehicle traveling data too. The radio transmission follows protocol of inter-vehicle communication. The vehicle traveling data may also follow certain encoding/decoding rules in order for receiving vehicle to retrieve that. The above steps are repeated to constantly broadcasting updated vehicle traveling data for road safety enhancement.

Figure 7A:
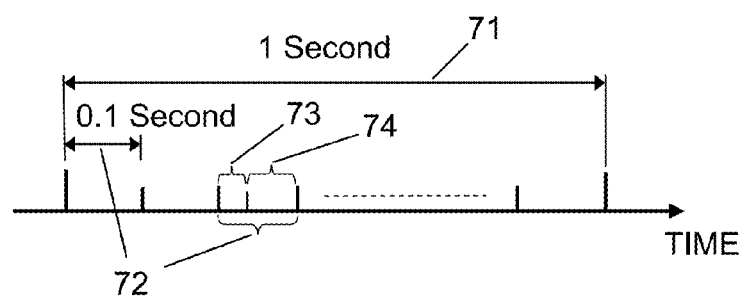
FIGS. 7A and 7B illustratively show an example of a possible protocol of inter-vehicle communication useful for the invention.
Figure 7B:
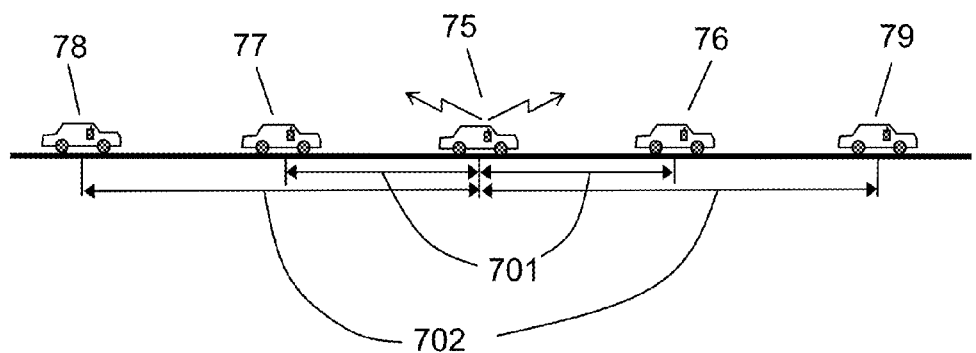

Inter-vehicle communication refers to any communication means that is useful for inter-vehicle data sharing. It may be a specially conceived communication architecture for inter-vehicle data sharing or a mobile communication network that may be used for the purpose. Ad hoc communication mode of wireless communication or Wi-Fi communication is a good candidate to perform the broadcasting and receiving of vehicle traveling data. Many mobile phone or smart phone already support that kind of communication. And, Such ad hoc communication among mobile phones is becoming standard feature of mobile phone or smart phone. Thus, making implementation of the methods of road safety enhancement puts very little cost burden on drivers. An example of protocol of inter-vehicle communication is illustratively shown in FIGS. 7A and 7B. In the example, cycle time of broadcasting is fixed. The cycle time is then divided into many smaller time slots. Each vehicle in a small area occupies one time slot to broadcast its traveling data and listens to others' broadcasting in other time slots. As illustratively shown in FIG. 7A, cycle time 71 is set as 1 second. The cycle time is divided into ten time slot 72, each for 0.1 second. For each time slot, only one vehicle can broadcast. To guarantee that, time slot 72 is further divided into time section 73 and 74. If time slot 72 is already used by a vehicle, the vehicle starts broadcasting during time section 73. If time slot 72 is not used, a vehicle may listen for radio transmission during time section 73. If no radio transmission is detected during time section 73, the vehicle may start broadcasting at beginning of time section 74. Next cycle, the vehicle can start broadcasting during time section 73 of the same time slot as last cycle. GPS time may be used as the precise time reference for implement such time-division-broadcasting protocol. The broadcasting radio transmission is intended for receiving by nearby vehicles in a certain distance of ranging from 100 meters to 200 meters because only vehicles within the certain distance matter each other in term of road safety. Emission power of broadcasting should be controlled for saving energy and reducing interference. To reduce communication traffic confliction, emission power of radio transmitter is adjusted about to cover range twice as large as the mattered distance, as illustratively shown in FIG. 7B. In the showing of FIG. 7B, vehicles 75 to 70 move on road. Assuming vehicle 75 is broadcasting, mattered distance 701, which is distance between vehicle 75 and vehicle 77 or between vehicle 75 and vehicle 76, is the mattered distance for road safety concern. The emission power sent by the MCD on vehicle 75 can be received as far as by the MCD on vehicle 78 and vehicle 79. Receiving range represented by reference numeral 702, which is between vehicle 75 and vehicle 78 or between vehicle 75 and vehicle 79, is set to be as twice as mattered distance 701. This arrangement ensures that vehicle within the receiving range shares time slot allocations and vehicle positioned within the mattered distance always gets stronger signal from vehicle 75 than that from other vehicle broadcasting in the same time slot but locating outside of the receiving range. This receiving range may be dynamically changed according to radio signal absorption by ambient. One way to achieve that is to let the MCD measure received signal level of intensity and calculate distance from broadcasting source, then determine its emission power for broadcasting according to the measured signal intensity and the signal transmission distance. Another way to achieve that is to let a central control station determine emission power for broadcasting and notify vehicles through wireless communication to comply.

In accordance with the invention, the MCD performs the methods of road safety enhancement through executing software applications on its computing platform. The software application executed by processor of the MCD controls peripherals such as GPS receiver, digital camera and radio transmitter/receiver through communication interfaces to perform necessary functions and processes related data accordingly to fulfill process of the method. The software applications may share data among them to carry on processes of the methods. The software application may use audio or display or both of the MCD to present information or alert to driver for road safety enhancement.

Figure 8:
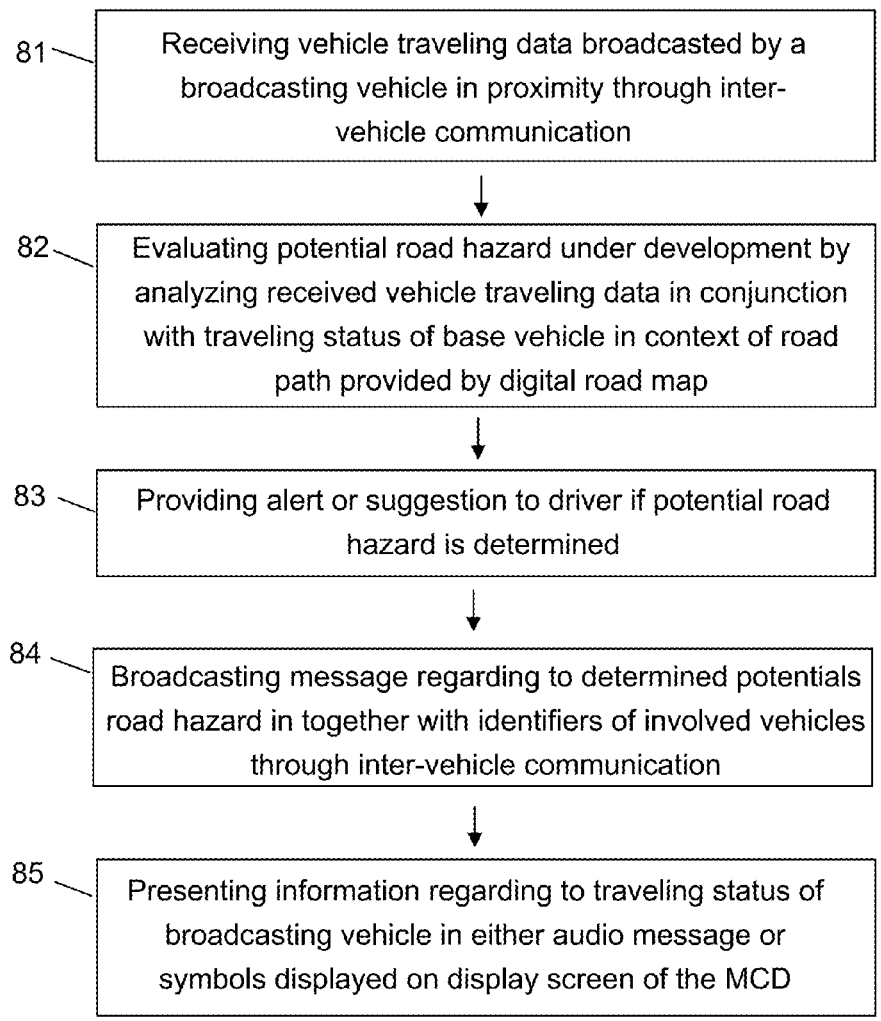
FIG. 8 is a flowchart illustratively showing a method of road hazard early warning for road safety enhancement, in accordance with the invention.

In accordance with the invention, a method of road hazard early warning using the mobile communication device (MCD) on board a base vehicle generally receives traveling data of a broadcasting vehicle through inter-vehicle communication and determines potential road hazard under development between base vehicle and broadcasting vehicle by evaluating received traveling data of the broadcasting vehicle in conjunction with vehicle traveling status of base vehicle in context of road path provided by digital road map. The method is illustrated by the flowchart shown in FIG. 8. Referring to step 81, the MCD receives vehicle traveling data of a broadcasting vehicle in proximity through inter-vehicle communication. The traveling data of the broadcasting vehicle may be broadcasted using the method of vehicle traveling data broadcasting disclosed in the disclosure. Referring to step 82, the MCD evaluates potential road hazard under development between base vehicle and broadcasting vehicle by analyzing received traveling data of the broadcasting vehicle in conjunction with vehicle traveling status of base vehicle in context of road path provided by digital road map. The vehicle traveling status of base vehicle comprises vehicle moving data and, if available, vehicle steering data. Because vehicles involved in road hazard evaluation move along road path, they are placed in context of road path to determine whether there is a potential collision under development. Generally, road hazard evaluation may use safe distance criteria or safe time criteria or mixing of both. Safe distance criteria means to have involved vehicles maintained a safe distance between them upon considering their moving speeds and relative lane location. The safe distance is a predetermined set of values for a variety of speed and relative lane location, which is viewed as necessary distance for driver to respond when unexpected event suddenly occurs. the safe time criteria means to have involved vehicles to keep a safe time before a possible contact or collision is incurred. The safe time is also dependent of vehicle speed and relative lane location. For example, when one vehicle follows the other vehicle, time-to-meet calculated from their distance and relative speed should be larger than the safe time considering their moving speeds to be treated as no road hazard risk or collision risk. The safe time should leave sufficient time for driver to take action to an unexpected event or alert and for vehicle to respond under driver's action to avoid potential collision. Determining details for the two criteria is within normal practice and reasonable work load of ordinary skilled in the art upon teaching or illustration of the disclosure. Referring to step 83, if a potential road hazard is determined, driver is notified by the MCD through audio alert or symbol alert on display screen. Referring to step 84, a message regarding to determined potential road hazard in together with identifiers of involving vehicle may be broadcasted through inter-vehicle communication to call up attention of the other involving vehicle. Referring to step 85, no matter whether a potential road hazard is found, information regarding to traveling status of broadcasting vehicle can be presented to driver either in form of audio message or symbols displayed on display screen for improving driver's road situation awareness. The traveling data of broadcasting vehicle may be stored for tracking movement of the vehicle. It is readily recognizable that an identifier to identify the MCD, which in turn can be used to identify the vehicle having the MCD on board, may be included in broadcasting of vehicle traveling data. Thus, receiving vehicle traveling data in together with the identifier can easily assort the data to associated vehicle, thus facilitating tracking movement of the vehicle.

It is particularly pointed out that traveling status of receiving vehicle is constantly monitored by the MCD using GPS and, if applicable, GPS-update-interval speed positioning for vehicle positioning and image capturing and recognition of instrument cluster for speed of vehicle, and, if applicable, vehicle steering data. Therefore, the MCD has traveling data of receiving vehicle in access for the method of road hazard early warning and also for other methods of road safety enhancement if the MCD is used for thereof.

Figure 9A:
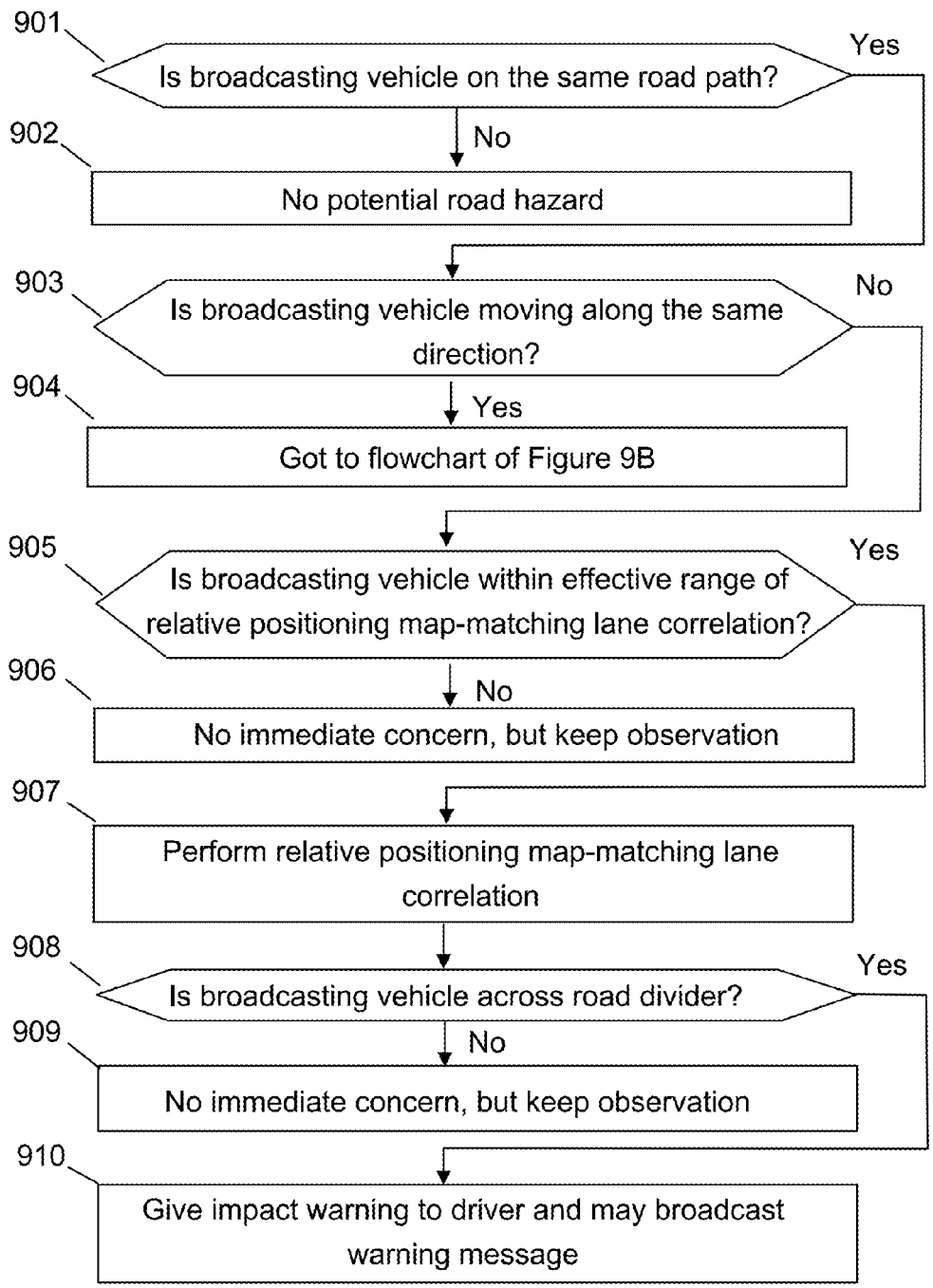
FIGS. 9A and 9B illustratively gives an example of process of the road hazard evaluation, which is useful for method of road hazard early warning, in accordance with the invention.
Figure 9B:
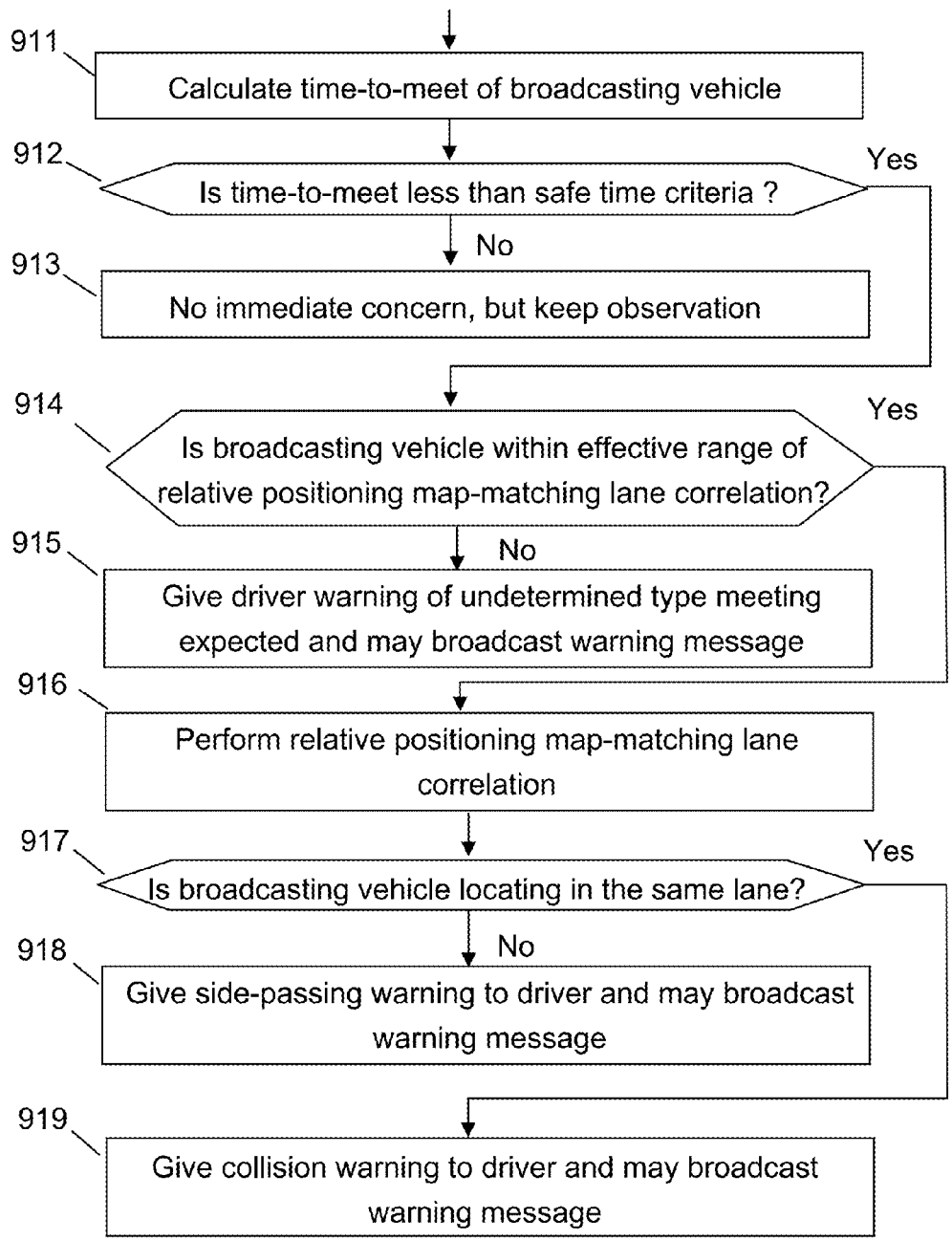

In accordance with the invention, the road hazard evaluation of the method of road hazard early warning may be improved by lane recognition using relative positioning map-matching lane correlation disclosed above in the disclosure. Flowcharts shown in FIGS. 9A and 9B illustratively gives an example of process of the road hazard evaluation. According to the flowchart of FIG. 9A, referring to step 901, with vehicle traveling data of broadcasting vehicle in access, the MCD on board receiving vehicle (also referred as based vehicle) places broadcasting vehicle and base vehicle in context of local road path provided by digital road map to find out whether the two vehicles are traveling on the same road path. Referring to step 902, if the two vehicles are not on the same path, it is considered to have no potential road hazard. We will discuss the case of two vehicles not traveling on the same path but approaching the same intersection in other part of the disclosure. If the two vehicle are moving on the same road path, referring to step 903, the MCD uses either direction data included in the vehicle traveling data if available or moving direction obtained by location tracking along the road path to determine whether broadcasting vehicle is moving along the same direction as base vehicle. If the two vehicles are not moving along the same direction of the road path, the evaluation is to determine whether broadcasting vehicle crosses divider line of two directions of the road path. To find out that, it is necessary to perform relative positioning map-matching lane correlation between the two vehicles. Although here is not intended to tell lane location of each vehicle, the method of relative positioning map-matching lane correlation still works for the purpose hereof. If two vehicles moving oppositely have head-on collision under development, they must both locate on outer most lane of each side. Thus, their lanes are next to each other but on opposite side to the other. So, relative positioning map-matching lane correlation is applicable for the case hereof to tell whether two vehicles are on different lanes. If they are on different lanes, there is not head-on collision risk. If the lane correlation is not able to tell that with a certain assurance, it is very likely that one vehicle may cross the divider line and a potential impact is under development. Referring to step 905, in order to effectively use relative positioning map-matching lane correlation, broadcasting vehicle is checked up whether it is within effective range of the lane correlation. The effective range is primarily determined by lane configuration and straightness in local road path. For example, if road path curves to one side, effectively range may be a range along the road path having curved-off distance comparable to lane width. Referring to step 906, if it is not within the effective range, it is considered no immediate concern but observation needed. Referring to step 907, if it is within the effective range, the MCD performs relative positioning map-matching lane correlation between the two vehicles. Referring to step 908, the output result of the lane correlation is then used by the MCD to determine whether broadcasting vehicle crosses the divider line. Referring to step 909, if not, it is considered no immediate concern but observation needed. Referring to step 910, if so, alert of impact or impact warning is given by the MCD to driver. A message regarding the alert or warning may be broadcasted through inter-vehicle-communication to get attention of driver of the other vehicle involved. The alert or warning message may contain identifiers associated with involved vehicles to facilitate the purpose thereof.

Back to step 903, if the two vehicles are moving along the same direction of the road path, the evaluation is to determine whether potential collision or hazard is under development between the two vehicles. Referring to step 904, following steps are illustratively shown by the flowchart of FIG. 9B.

According to the flowchart of FIG. 9B, referring to step 911, the MCD is to calculate time-to-meet of broadcasting vehicle with base vehicle. The MCD may also take account of trend of speed acceleration or deceleration to calculate time-to-meet more accurately. Referring to step 912, the MCD is to determine whether the time-to-meet is larger or less than safe time criteria according to vehicle moving speeds and road conditions. Referring to step 913, if the time-to-meet is larger than safe time criteria, it is considered no immediate concern but observation needed. If the time-to-meet is less than safe time criteria, in order to determine a potential road hazard or collision under development, it is necessary to use relative positioning map-matching lane correlation to determine whether the two vehicles are moving on the same lane. Referring to step 914, in order to effectively use relative positioning map-matching lane correlation, broadcasting vehicle is checked up whether it is within effective range of the lane correlation. Referring to step 915, if it is not within the effective range, the MCD gives driver alert or warning of undetermined type meeting or impact expected. In such case, driver at least is alerted to reinforce attention on incoming direction of the other vehicle involved thereof. A message regarding the alert or warning may be broadcasted to call up attention of driver of the other vehicle. Referring to step 916, if it is within the effective range, the MCD performs relative positioning map-matching lane correlation between the two vehicle. Referring to step 917, the output result of the lane correlation is then used by the MCD to find out whether the two vehicles are on the same lane. Referring to step 918, if the two vehicles are moving on different lanes, the MCD gives driver a side-passing alert or warning and may broadcast a message regarding the alert or warning to the other vehicle involved. Such case does not have a potential collision under development. But, considering side passing often induces real road danger, the side passing alert helps both drivers on involved vehicle better prepared for that. Referring to step 919, if the two vehicles are moving on the same lane, a potential collision alert or warning is given to driver. This case is real danger for driver and vehicle, and possibly others too. The alert and warning should take as much effort as possible to get driver responding fast and properly to avoid collision. A message regarding the potential collision alert or warning may be broadcasted through inter-vehicle communication to get driver on the other vehicle acting accordingly to avoid collision.

If vehicle steering data is included in vehicle traveling data broadcasted by broadcasting vehicle, receiving vehicle or base vehicle may analyze the steering data in conjunction with moving status of the two vehicles to determine whether a potential road hazard or collision is to be caused by steering action indicated by the steering data. For example, if the two vehicles are close to each other but on two adjacent lanes, broadcasting vehicle changing lane toward the lane of base vehicle may induce potential road hazard. If the two vehicles are next to each other but on two adjacent lanes, such lane changing will cause a side collision. With steering data shared among vehicles, such case or similar cases can be detected immediately and driver initializing the steering action can be immediately alerted to correct his/her steering action. The steering data may include indication of left or right turn signal or steering action or both. For case to avoid side collision, they are viewed having similar effect since driver should be alerted as quick as possible to correct either intended or going-on steering action. Vehicle steering data is also useful for intersection road hazard evaluation. If the two vehicles are moving on different road paths but approaching the same intersection in very small time interval, vehicle steering data retrieved from broadcasted vehicle traveling data allows receiving vehicle or base vehicle to be prepared for sudden front appearing of broadcasting vehicle, which is going to turn or is turning toward base vehicle. Due to fast changing situation at road intersection, such early warning on vehicle turning helps drivers approaching a road intersection better prepared for incoming road situation at the road intersection, especially at low-light condition or night or severe weather condition.

Figure 10:
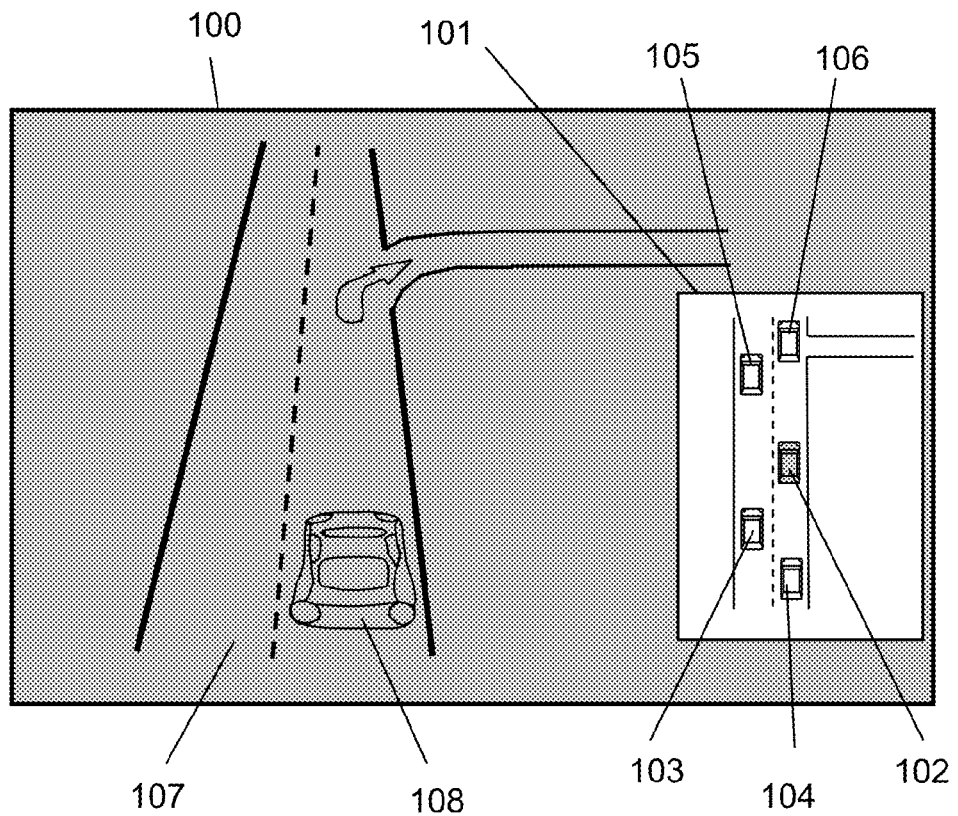
FIG. 10 is an example to illustrate displaying of nearby road usage situation in accordance with the invention.
Figure 11A:
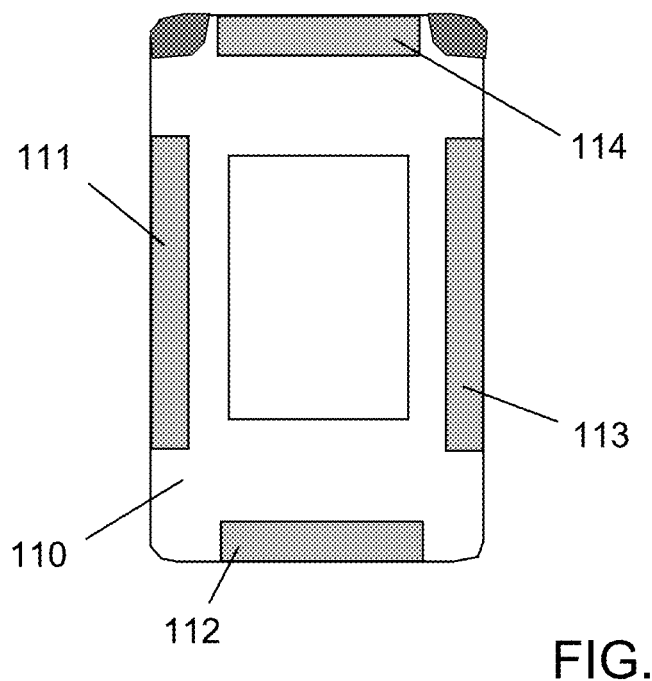
FIGS. 11A, 11B, 11C, and 11D are examples of vehicle icon useful for displaying road usage situation and road hazard warning in accordance with the invention.
Figure 11B:
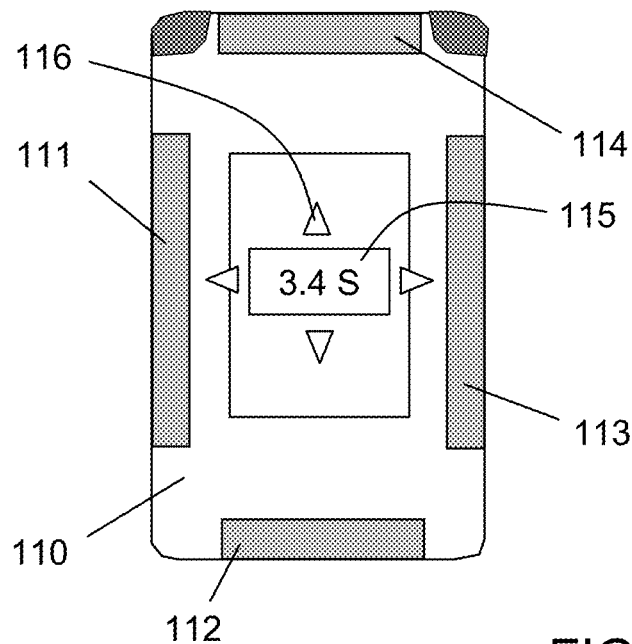
Figure 11C:
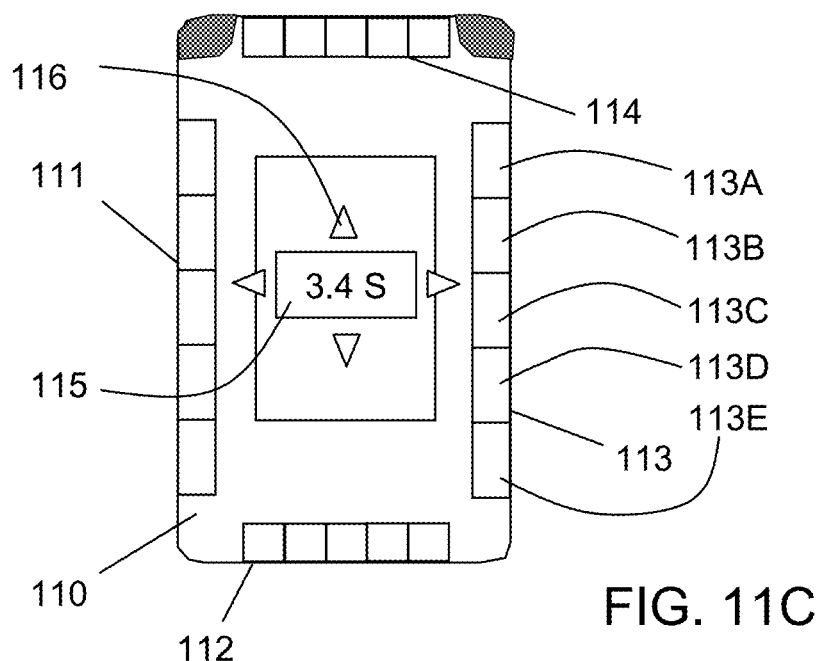
Figure 11D:
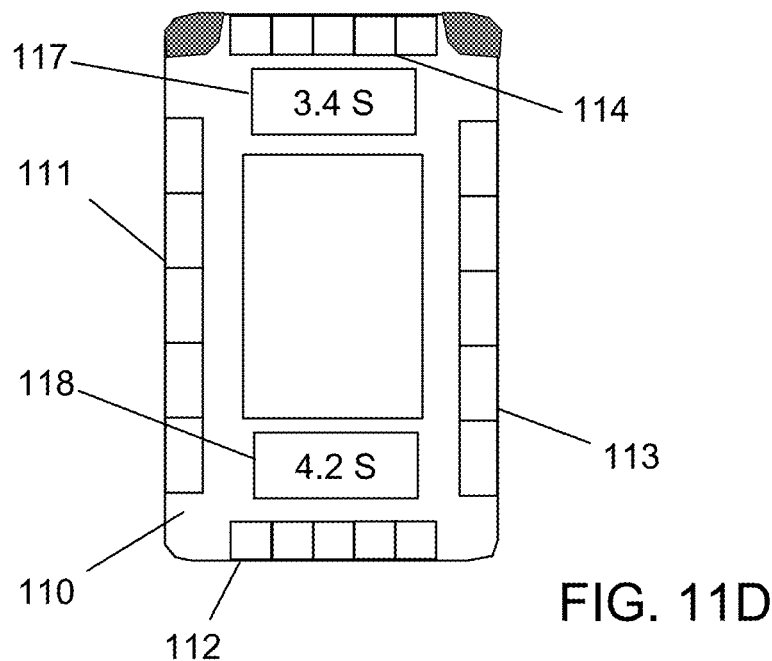
Figure 12:
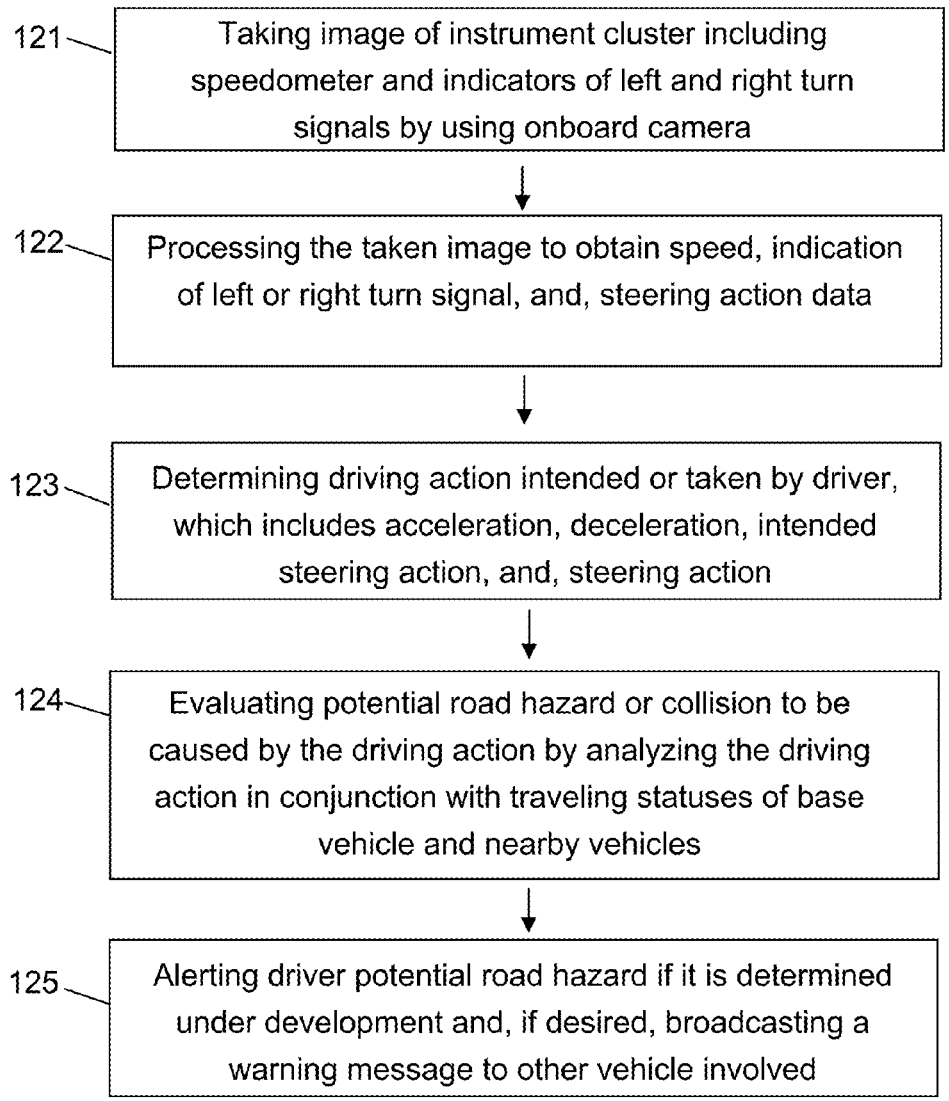
FIG. 12 is a flowchart illustratively showing a method of driving action warning for road safety enhancement, in accordance with the invention.

Road safety may also be enhanced by providing driver a clear and accurate showing of road usage situation in proximity. If driver is aware of how nearby vehicles are distributed on road path and what driving action nearby vehicle is taken, he or she can make better decision on his/her own driving action and avoid making dangerous driving action. With better road usage situation in mind, driver may respond more properly when a sudden road danger appears. The MCD on board a vehicle may constantly obtain and track vehicle travel status of own vehicle and nearby vehicle that periodically broadcasts its traveling data through inter-vehicle communication, similarly as described above in the disclosure. In order for driver to take advantage from the rich information regarding nearby vehicles, the MCD must use a proper way to present driver with the information. The drawing of FIG. 10 illustratively gives a displaying example to present nearby vehicle information on display screen 100 of the MCD. In the drawing, displayed scenario is similar as displayed scene for road navigation, but having a portion, preferred to be adjacent a corner or side, of display screen 100 occupied by a road usage situation 101. In more details, most area of display screen 100 is displaying road guidance for road navigation, which is illustrated by a vehicle icon 108 appearing on a road 107 and a right turn symbol representing next driving instruction given for road navigation. It is very common for GPS road navigation using similar displayed scene to provide road guidance during driving. In addition, the MCD presents road usage situation 101 of nearby vehicle on right lower portion of screen 100, thus not obstructing driver to access road guidance. Inside area of road usage situation 101, basic shape of road approximately representing local road path is presented as background. Vehicle symbol 102 represents base vehicle where the MCD is on board. Nearby vehicles are represented by vehicle symbols 103, 104, 105, and 106 according to their relative positions to base vehicle. With a quick view on the road usage situation, driver can be quickly acquainted with relative positions of nearby vehicles. When a road hazard warning is given, the MCD may change appearance of vehicle symbol corresponding to the other vehicle involved in the warning. For example, color of vehicle symbol may be changed, or, vehicle symbol is flashing to indicate a warning involving corresponding vehicle. An alternative displaying example for road usage situation is illustratively given in FIGS. 11A, 11B, 11C and 11D. The displaying example is basically an vehicle icon having road usage situation shown thereon. The vehicle icon can be used as vehicle icon or incorporated into vehicle icon for road navigation, thus not requiring portion of display screen dedicated for road usage situation. Referring to the drawing of FIG. 11A, vehicle-shape-like 110 represents base vehicle where the MCD is on board. Indicators 111 and 113 is placed on left side and right side of vehicle-shape-like 110 respectively. Indicators 112 and 114 is placed on rear side and front side of vehicle-shape-like 110 respectively. These indicators may be in any form or shape unless it is proper to place on top of vehicle-shape-like 110. In the drawing, these indicators are shown as bar shape. These indicators are used to display road usage situation according to relative position of other vehicle to base vehicle. For example, if a vehicle is located in front of base vehicle, indicator 114 changes accordingly to indicate presence of vehicle in front. Similar usage is applied to the other indicators. When a road hazard warning is given, indicator corresponding to incoming side of the warning changes accordingly, for example flashing, to show the warning. Referring to the drawing of FIG. 11B, a timer symbol 115 to display count-down time of expected occurrence of potential road hazard is added. When a road hazard warning is given, the timer symbol is going to display a counting down value representing time left for the road hazard to occur. In case of more than one road hazard warning presented concurrently, the timer symbol may display count-down time either for first expected hazard or for most severe hazard. For the case, arrow symbols 116 are added around the timer symbol to indicate which side the timer symbol is displaying for. Referring to the drawing of FIG. 11C, indicators 111, 112, 113 and 114 are further divided to have more parts, like a scale bar. Taking indicator 113 as example, the indicator is divided to have five parts represented by reference numeral 113A, 113B, 113C, 113D and 113E respectively from top to bottom. In use, part 113A is used to represent a vehicle on right side located farther ahead. Part 113B is used to represent a vehicle on right side located near ahead. Part 113C is used to represent a vehicle nearly parallel on right side. Part 113D is used to represent a vehicle on right side located near behind. Part 113E is used to represent a vehicle on right side located farther behind. When road hazard warning is given, corresponding part changes accordingly to show relative positioning of the warning. Left side indicator 111 works similarly as right side indicator 113. Front and rear indictors 114 and 112 may work similarly as side indicator 111 and 113. But, since only closest vehicle in front and rear matters, indicators 114 and 112 may be used in different way from side indicators 111 and 113. One use of indicators 114 and 112 is to let them indicate following distance to front vehicle and rear vehicle respectively. For example, when following distance is getting closer, more parts of the indicator are filled with solid color, thus creating a direct feeling to driver about safety concern caused by closer following distance. Referring to the drawing of FIG. 11D, two timer symbols 117 and 118 are placed adjacent front indicator 114 and rear indicator 112 to respectively display count-down time of time-to-impact of front or rear road hazard warning.

In accordance with the invention, a method of driving action warning uses the MCD on board a base vehicle to detect driver's driving action and evaluate potential road hazard or collision to be caused by the driving action by analyzing the driving action in conjunction with traveling status of base vehicle and nearby vehicles. Once driver's driving action is found dangerous, the MCD is to immediately alert driver to correct his/her driving action. The method is advantageous in avoiding driver initiated road hazard. The method is illustrated by the flowchart shown in FIG. 8. In the flowchart, referring to step 121, the MCD take image of instrument cluster of the base vehicle including speedometer and indicators of left and right turn signals by using its onboard camera. Referring to step 122, the image is processed to obtain speed of vehicle from indication of speedometer, indication of left or right turn signal, and steering action data from steering wheel rotation, as described above in the disclosure. Referring to step 123, based on the obtained data in step 122, the MCD determines what driving action driver intends to take or is taking. The driving action may be acceleration or deceleration indicated by change of the speed, intended steering action indicated by the indication of left or right turn signal, or, going-on steering action indicated by the steer action data. Referring to step 124, then, the MCD evaluates potential road hazard or collision to be caused by the driving action by analyzing the driving action in conjunction with traveling status of base vehicle and nearby vehicles. For example, when driver makes an acceleration, the acceleration is analyzed in conjunction with moving data of front vehicle to determine whether the acceleration is potentially causing a collision with front vehicle. When driver makes an deceleration, the deceleration is analyzed in conjunction with moving data of rear vehicle to determine whether the deceleration is potentially causing a collision with rear vehicle. When driver intends to change to left or right lane or is doing so, the lane change is analyzed in conjunction with moving data of side vehicle to determine whether the lane change is potentially causing a collision with side vehicle. The moving data of base vehicle is constantly updated by the MCD through GPS and image capturing and recognition of instrument cluster and stored for tracking moving status of the vehicle. GPS-update-interval speed positioning may be used to get positioning data during GPS update interval. The moving data of nearby vehicles are received through vehicle traveling data broadcasting and stored for tracking moving statuses of the vehicles. Relative positioning map-matching lane correlation may be used to identify lane positioning relations of base vehicle to nearby vehicles. Referring to step 125, once a potential collision is determined, the MCD alerts driver to correct the driving action to avoid potential collision. A message regarding alert or warning of the potential collision may be broadcasted to the other vehicle involved. The method is capable of detecting driver's driving action prior to occurring or immediately after starting, thus responding fast to driver's driving action. Therefore, it is prompt to alert driver for improper driving action upon nearby road usage situation and allows driver to correct the driving action in time.

Figure 13:
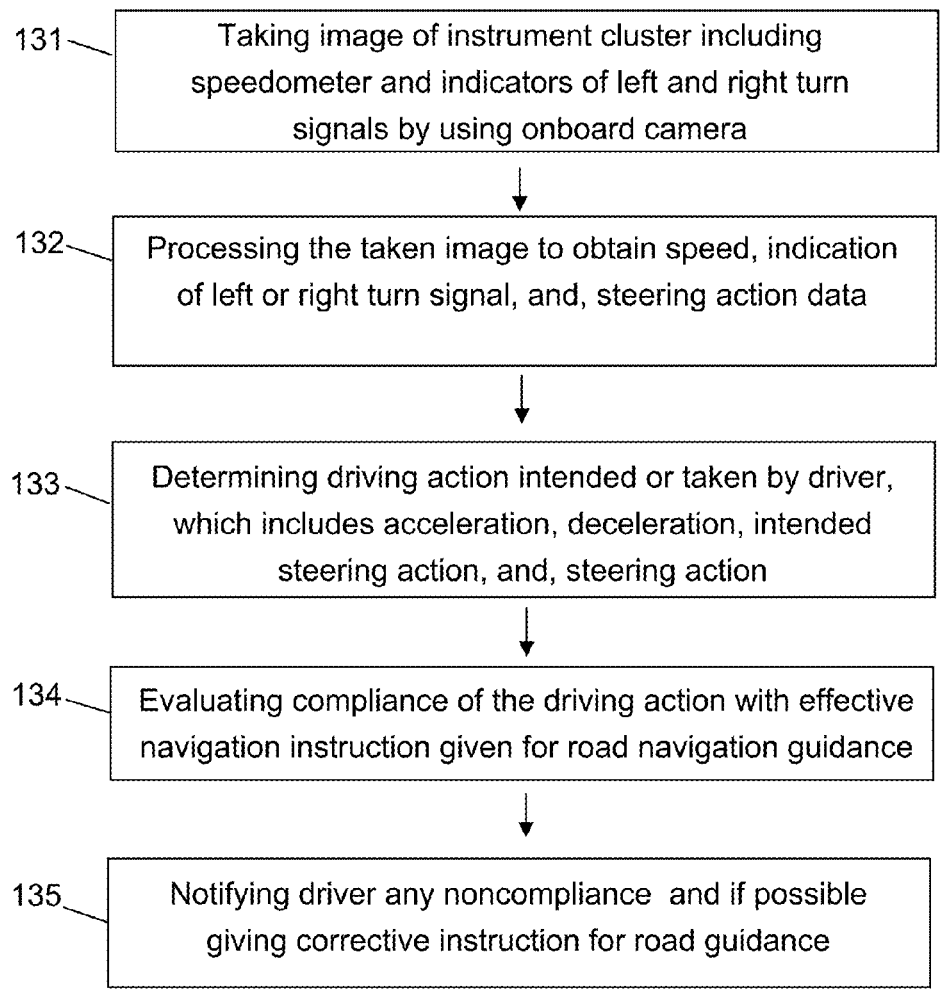
FIG. 13 is a flowchart illustratively showing a method of road navigation enhancement for road safety enhancement, in accordance with the invention.

In accordance with the invention, the disclosure further presents a method of road navigation enhancement, in which a mobile communication device on board a base vehicle may perform relative positioning map-matching lane correlation by utilizing position data of nearby vehicle received through inter-vehicle communication to determine lane location of base vehicle and/or GPS-update-interval speed positioning to get more timely updated position data of base vehicle, and, then, use the lane location and/or the timely updated position data to enhance road navigation. With lane location available, road navigation can give driver more precise and more detailed steering instruction. With position data refreshed more frequently, road navigation is more responsive to give corrective road guidance when incompliance to road guidance occurs. The method may also use driver's steering action such as left/right steering or acceleration/deceleration, if available, to enhance road navigation. Driver's steering action may be obtained by a mobile communication device (MCD) coupled with movement of steering wheel to capture images of instrumental cluster of vehicle using onboard camera of the MCD and process captured images to detect the movement of steering wheel or speed indication of speedometer. Analyzing continuous steering actions over a time span after initialization can determine whether vehicle is making lane shift, road turn, or other change of movement. The method allows real time response of road navigation to driver's steering action. Furthermore, driver's driving action including acceleration/deceleration, intended left/right steering indicated by indication of left/right turn signal, and going-on steering action indicated by steering wheel rotation may be used to determine driving compliance to navigation instructions and notify driver to correct if non-compliance is found. A method of road navigation enhancement using the driving compliance is illustrated by the flowchart of FIG. 13. In the flowchart, In the flowchart, referring to step 131, the MCD take image of instrument cluster of the base vehicle including speedometer and indicators of left and right turn signals by using its onboard camera. Referring to step 132, the image is processed to obtain speed of vehicle from indication of speedometer, indication of left or right turn signal, and steering action data from steering wheel rotation, accordingly as described above in the disclosure. Referring to step 133, based on the obtained data in step 132, the MCD determines what driving action driver intends to take or is taking. The driving action may be acceleration or deceleration indicated by change of the speed, intended steering action indicated by the indication of left or right turn signal, or, going-on steering action indicated by the steer action data. Referring to step 134, then, the MCD evaluates the driving action to determine whether the driving action is in compliance with effective navigation instruction given for road navigation guidance. For an example, effective navigation instruction for a highway driver is to keep on the lane. Driving action determined by the MCD indicates that driver is going to change or is changing lane to take an exit ahead. A noncompliance with navigation instruction is determined. The MCD notifies driver that he should keep on the lane not taking the exit ahead. For another example, effective guidance of road navigation is to prepare for a turn at next road intersection. It is found that driver is making acceleration while approaching in proximity to the road intersection. So, a noncompliance with the guidance is determined. The driver is alerted or warned that reducing speed to take turn. For another example, effective guidance of road navigation is to prepare for taking an exit on right. It is found that driver's action is to go left or intended to go left. So, a noncompliance with the guidance is determined. The driver is alerted or warned to take exit on right. Similar way may be used to determine the noncompliance for various road navigation situations. Referring to step 135, if a noncompliance is determined, the MCD notifies driver the noncompliance and may give driver corrective instruction for road guidance if possible.

Figure 14:
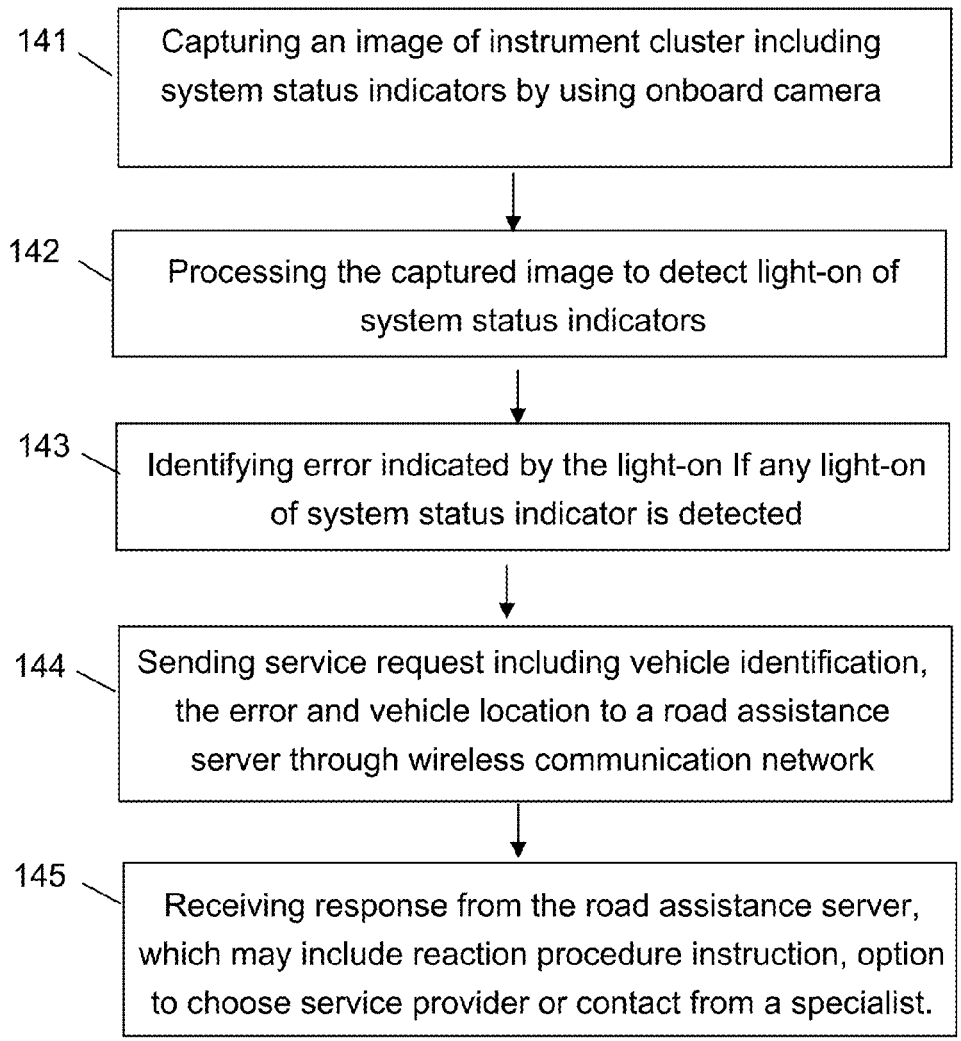
FIG. 14 is a flowchart illustratively showing a method of autonomous road assistance for road safety enhancement, in accordance with the invention.

In accordance with the invention, a method of autonomous road assistance uses the MCD on board a vehicle to detect light-on indication of vehicle system status indicators through image capturing and recognition of instrument cluster of the vehicle, and then, notify a road assistance server through wireless communication network regarding error indicated by the light-on indication. Following, the MCD may receive response or assistance instruction from the server, for example reaction procedure instruction, for driver to take proper measure. The MCD may give driver suggestion regarding the error according to locally stored service data. The server may also notify service professional to contact driver for road assistance or necessary vehicle service. The method provides a fast way, even without driver's awareness of such error, to take response on system error of the vehicle. Driver is assured to get assistance either through instruction or professional contact as fast as possible. The method is illustrated by the flowchart of FIG. 14. In the flowchart, referring to step 141, the MCD takes image of instrument cluster of the vehicle including system status indicators by using its onboard camera. Referring to step 142, the captured image is then processed to detect light-on of system status indicators. If no light-on is detected, the MCD repeatedly monitors the instrument cluster to detect light-on of system status indicators. Referring to step 143, if any light-on of system status indicator is detected, the MCD identifies error indicated by the light-on according to its stored information of error indication. Referring to step 143, then, the MCD sends a service request to a road assistance server through wireless communication network and possibly under assistance of internet network. The service request includes the error detected, vehicle identification, and GPS location of vehicle. Vehicle identification may be linked to or the same as an identifier of the MCD. The road assistance server processes the service request to give best response to the request. The response is sending to the MCD through wireless communication network. Referring to step 145, the MCD receives the response from the road assistance server and presents the response to driver in either audio form or visual form. The response may include a instruction or suggestion on procedure for driver to react to the error. The response may also include information about road assistance or nearby service provider for driver to decide whether to go for inspecting the error. The road assistance server may direct a service provider or a specialist to contact driver to discuss available service or assistance options for the error. The method is capable of operating autonomously without requiring driver's input. But, driver may choose to decide on his/her own whether to proceed to send the service request when the error is detected. The software application executing processes of the method on the MCD may be programmed to work autonomously or let driver decide the proceeding.

It should be understood that embodiments disclosed are only a few examples of possible implementations of the invention and their teachings may be used by ordinary skilled in related art to modify the embodiments or derive from the embodiments to form embodiment appearing not similar as the embodiments but still utilizing true merit and teaching spirit of the invention. Therefore, if any, the modification or derivation is still within the scope of the invention and all related rights are reserved.

I claim:

1. A method for road safety enhancement comprising:
    taking an image of at least a portion of an instrument cluster of a vehicle containing a speed indication of a speedometer on said instrument cluster;
    obtaining a speed data corresponding to said speed indication by processing said image; and,
    obtaining a steering data of a steering wheel rotation by processing said image to determine a tilt angle of said image according to a predetermined image orientation, wherein said tilt angle is associated with the steering wheel rotation.

2. The method of claim 1 further comprising:
    acquiring a location data corresponding to a location of the vehicle and a time data associated with said location data by using GPS (Global Positioning System); and,
    broadcasting said speed data in together with said location data and said time data through inter-vehicle communication.

3. The method of claim 1 further comprising:
    acquiring a location data corresponding to a location of the vehicle and a time data associated with said location data by using GPS (Global Positioning System) measurement, and, during update time interval of the GPS measurement, by using GPS-update-interval speed positioning in conjunction with said speed data; and,
    broadcasting said speed data and said steering data in together with said location data and said time data through inter-vehicle communication.

4. The method of claim 1 further comprising:
    acquiring a location data corresponding to a location of the vehicle and a time data associated with said location data by using GPS (Global Positioning System);

and,
broadcasting said speed data and said steering data in together with said location data and said time data through inter-vehicle communication.

5. The method of claim 1 further comprising: taking an image of an indication of indicators on instrument cluster of a vehicle; obtaining an indication data corresponding to said indication by processing said image of said indication; acquiring a location data corresponding to a location of the vehicle and a time data associated with said location data by using GPS (Global Positioning System); and, broadcasting said speed data, said steering data, and said indication data in together with said location data and said time data through inter-vehicle communication.

6. The method of claim 1 further comprising:
acquiring a location data corresponding to a location of the vehicle and a time data associated with said location data by using GPS (Global Positioning System), whereby said speed data, said steering data and said location data and said time data form primitives of a base traveling data;
receiving a source traveling data regarding to a nearby vehicle through inter-vehicle communication, wherein said source traveling data comprises a source location data and a source time data associated with said source location data and a source speed data, which are respectively corresponding to the location and the speed of the nearby vehicle at the moment represented by said source time data;
determining a road hazard under development by analyzing said source traveling data in conjunction with said base traveling data; and,
giving a warning regarding to said road hazard.

7. The method of claim 1 further comprising:
acquiring a location data corresponding to a location of the vehicle and a time data associated with said location data by using GPS (Global Positioning System) measurement, and, during update time interval of the GPS measurement, by using GPS-update-interval speed positioning in conjunction with said speed data, whereby said location data and said time data, said steering data and said speed data form primitives of a base traveling data;
receiving a source traveling data regarding to a nearby vehicle through inter-vehicle communication, wherein said source traveling data comprises a source location data and a source time data associated with said source location data and a source speed data, which are respectively corresponding to the location and the speed of the nearby vehicle at the moment represented by said source time data;
determining a road hazard under development by analyzing said source traveling data in conjunction with said base traveling data; and,
giving a warning regarding to said road hazard.

8. The method of claim 1 further comprising:
acquiring a location data corresponding to a location of the vehicle and a time data associated with said location data by using GPS (Global Positioning System), whereby said location data and said time data, said steering data and said speed data form primitives of a base traveling data;
receiving a source traveling data regarding to a nearby vehicle through inter-vehicle communication, wherein said source traveling data comprises a source location data and a source time data associated with said source location data and a source speed data, which are respectively corresponding to the location and the speed of the nearby vehicle at the moment represented by said source time data;
obtaining a lane relation between the vehicle and the nearby vehicle by performing relative positioning map-matching lane correlation based on said location data and said source location data;
determining a road hazard under development by analyzing said source traveling data in conjunction with said base traveling data under assistance of said lane relation; and,
giving a warning regarding to said road hazard.

9. The method of claim 1 further comprising:
acquiring a location data corresponding to a location of the vehicle and a time data associated with said location data by using GPS (Global Positioning System) measurement, and, during update time interval of the GPS measurement, by using GPS-update-interval speed positioning in conjunction with said speed data, whereby said location data and said time data, said steering data and said speed data form primitives of a base traveling data;
receiving a source traveling data regarding to a nearby vehicle through inter-vehicle communication, wherein said source traveling data comprises a source location data and a source time data associated with said source location data and a source speed data, which are respectively corresponding to the location and the speed of the nearby vehicle at the moment represented by said source time data;
obtaining a lane relation between the vehicle and the nearby vehicle by performing relative positioning map-matching lane correlation based on said location data and said source location data;
determining a road hazard under development by analyzing said source traveling data in conjunction with said base traveling data under assistance of said lane relation; and,
giving a warning regarding to said road hazard.

10. The method of claim 1 further comprising:
acquiring a location data corresponding to a location of the vehicle by using GPS (Global Positioning System) measurement, and, during update time interval of the GPS measurement, by using GPS-update-interval speed positioning in conjunction with said speed data; and,
giving guidance for road navigation according to said location data and said steering data.

11. The method of claim 1 further comprising:
obtaining a speed change by comparing said speed data with a previously stored speed data;
determining a road hazard under development by analyzing said speed change and said steering data in conjunction with moving status of the vehicle and moving statuses of other vehicles in proximity thereof; and,
giving a warning regarding to said road hazard.

12. The method of claim 1 further comprising:
obtaining a speed change by comparing said speed data with a previously stored speed data;
determining a noncompliance of said speed change and said steering data with a guidance effective for road navigation; and,
giving a warning regarding to said noncompliance.

13. A method for road safety enhancement comprising:
taking an image of at least a portion of an instrument cluster of a vehicle containing an indication of indicators on said instrument cluster;
obtaining a steering data of a steering wheel rotation by processing said image to determine a tilt angle of said image according to a predetermined image orientation, wherein said tilt angle is associated with the steering wheel rotation; and, obtaining an indication data corresponding to said indication by processing said image.

14. The method of claim 13 wherein said indication is corresponding to light-on status of indicators of left and right turn signals, and, said indication data is a turn signal data.

15. The method of claim 14 further comprising:
determining a road hazard under development by analyzing said turn signal data and said steering data in conjunction with moving status of the vehicle and moving statuses of other vehicles in proximity thereof; and,
giving a warning regarding to said road hazard.

16. The method of claim 14 further comprising:
determining a noncompliance of said turn signal data and said steering data with a guidance effective for road navigation; and,
giving a warning regarding to said noncompliance.

17. The method of claim 13 wherein said indication is corresponding to light-on status of indicators of vehicle system warning, and, said indication data is a system warning data.

18. The method of claim 17 further comprising:
acquiring a location data corresponding to a location of the vehicle using GPS (Global Positioning System);
sending a service request associated with said system warning data to a road assistance server through wireless communication network, wherein said request comprises said location data; and,
receiving a response corresponding to said request from said server through wireless communication network.

19. A method for road safety enhancement comprising:
taking an image of at least a portion of an instrument cluster of a vehicle; and,
obtaining a steering data of a steering wheel rotation by processing said image to determine a tilt angle of said image according to a predetermined image orientation, wherein said tilt angle is associated with the steering wheel rotation.

20. The method of claim 19 further comprising:
determining a road hazard under development by analyzing said steering data in conjunction with moving status of the vehicle and moving statuses of other vehicles in proximity thereof; and,
giving a warning regarding to said road hazard.

21. The method of claim 19 further comprising:
determining a noncompliance of said steering data with a guidance effective for road navigation; and,
giving a warning regarding to said noncompliance.

* * * * *